(12) United States Patent
Koujiro

(10) Patent No.: US 12,001,738 B2
(45) Date of Patent: Jun. 4, 2024

(54) IMAGE FORMING APPARATUS AND DETERMINATION METHOD IN PROCESSING APPARATUS FOR DETERMINING WHETHER AUTHENTICATION INFORMATION SATISFIES AUTHENTICATION REQUIREMENT

(71) Applicant: SHARP KABUSHIKI KAISHA, Sakai (JP)

(72) Inventor: Takuya Koujiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/202,984

(22) Filed: May 29, 2023

(65) Prior Publication Data

US 2023/0384996 A1   Nov. 30, 2023

(30) Foreign Application Priority Data

May 31, 2022   (JP) .................................. 2022-088680

(51) Int. Cl.
*G06F 3/12*   (2006.01)
(52) U.S. Cl.
CPC .......... *G06F 3/1238* (2013.01); *G06F 3/1222* (2013.01)

(58) Field of Classification Search
None
See application file for complete search history.

(56) References Cited

U.S. PATENT DOCUMENTS

| 2015/0199155 | A1* | 7/2015 | Cho | G06F 3/1222 |
| | | | | 358/1.14 |
| 2016/0170680 | A1* | 6/2016 | Osada | G06F 3/0622 |
| | | | | 711/163 |
| 2017/0339310 | A1* | 11/2017 | Tonegawa | H04N 1/44 |
| 2020/0183628 | A1* | 6/2020 | Boo | G06F 3/1238 |
| 2020/0372141 | A1* | 11/2020 | Song | G06F 3/1222 |
| 2023/0021914 | A1* | 1/2023 | Hirosawa | G06F 3/1285 |
| 2023/0388433 | A1* | 11/2023 | Mori | H04N 1/4413 |

FOREIGN PATENT DOCUMENTS

JP   2007185814 A   7/2007

* cited by examiner

*Primary Examiner* — Henok Shiferaw
(74) *Attorney, Agent, or Firm* — ScienBiziP, P.C.

(57) ABSTRACT

An image forming apparatus, includes: a storage storing authentication information on a user; a setter setting, for each user, an authentication requirement for the authentication information; an authenticator authenticating the user based on the authentication information; and a determiner performing determination as to whether the authentication information on a user authenticated by the authenticator satisfies the authentication requirement corresponding to the user.

6 Claims, 20 Drawing Sheets

FIG. 3

| ID | LOGIN NAME | PASSWORD | USER NAME | LAST LOGIN DATE AND TIME | AUTHORITY CLASSIFICATION |
|----|------------|-----------|-----------|--------------------------|--------------------------|
| 1 | Admin | ABC@123 | ADMINISTRATOR a | MAY 12, 2022 20:00:02 | ADMINISTRATOR |
| 2 | UserA | mypass12345 | USER A | MAY 11, 2022 17:04:36 | GENERAL USER |
| 3 | UserB | 1111 | USER B | NOVEMBER 27, 2021 10:20:22 | GENERAL USER |
| 4 | UserC | 23456 | USER C | APRIL 28, 2022 14:51:04 | GENERAL USER |
| ⋮ | ⋮ | ⋮ | ⋮ | ⋮ | ⋮ |

FIG. 4

| ID | LOGIN NAME | PASSWORD | USER NAME | DELETION DATE AND TIME | AUTHORITY CLASSIFICATION |
|---|---|---|---|---|---|
| 101 | UserX | abc@789 | USER X | APRIL 1, 2022 17:00:00 | GENERAL USER |
| 102 | UserY | 67890mypass | USER Y | APRIL 1, 2022 17:00:00 | GENERAL USER |
| ⋮ | ⋮ | ⋮ | ⋮ | ⋮ | ⋮ |

FIG. 5

| SETTING ITEM NAME | | | SETTABLE RANGE | SETTING CONTENT | |
|---|---|---|---|---|---|
| USER AUTHENTICATION FUNCTION | | | ENABLE/DISABLE | ENABLED | D100 |
| PASSWORD POLICY SETTING FUNCTION | | | ENABLE/DISABLE | ENABLED | D110 / D120 |
| ADMINISTRATOR | MINIMUM PASSWORD LENGTH | | 0-32 | 8 | D122a |
| | PASSWORD CREATION RULE | | ENABLE/DISABLE | ENABLED | D124a |
| | PROHIBITION OF REUSE OF UNCHANGED PASSWORD | | ENABLE/DISABLE | ENABLED | D126a |
| GENERAL USER | MINIMUM PASSWORD LENGTH | | 0-32 | 5 | D122b |
| | PASSWORD CREATION RULE | | ENABLE/DISABLE | ENABLED | D124b |
| | PROHIBITION OF REUSE OF UNCHANGED PASSWORD | | ENABLE/DISABLE | ENABLED | D126b |
| TIMING FOR POLICY CHECK | | | – | – | D130 |
| ADMINISTRATOR | TIMING OF LOGIN | | ENABLED | ENABLED | D132a |
| | POLICY CHECK ACCORDING TO AUTHENTICATION MEANS | | ENABLED | ENABLED | D134a |
| | | QUICK AUTHENTICATION | ENABLED | ENABLED | D136a |
| | | IC CARD AUTHENTICATION | ENABLED | ENABLED | |
| | TIMING OF PASSWORD REGISTRATION/ CHANGE AFTER SETTING CHANGE | | ENABLED | ENABLED | D138a |
| GENERAL USER | TIMING OF LOGIN | | ENABLE/DISABLE | DISABLED | D132b |
| | POLICY CHECK ACCORDING TO AUTHENTICATION MEANS | | ENABLE/DISABLE | DISABLED | D134b |
| | | QUICK AUTHENTICATION | ENABLE/DISABLE | – | D136b |
| | | IC CARD AUTHENTICATION | ENABLE/DISABLE | – | |
| | TIMING OF PASSWORD REGISTRATION/ CHANGE AFTER SETTING CHANGE | | ENABLE/DISABLE | ENABLED | D138b |
| DELETION OF GENERAL USERS HAVING NOT LOGGED IN FOR CERTAIN PERIOD | | | ENABLE/DISABLE | ENABLED | D140 |
| PERIOD | | | 1-365 | 365 | |
| PROHIBITION OF REUSE OF DELETED USERS | | | ENABLE/DISABLE | ENABLED | D150 |
| PERIOD | | | 1-365 | 365 | |
| ⋮ | | | ⋮ | ⋮ | |

FIG. 11

| ID | LOGIN NAME | PASSWORD | USER NAME | GROUP NAME | LAST LOGIN DATE AND TIME | AUTHORITY CLASSIFICATION |
|---|---|---|---|---|---|---|
| 1 | Admin | ABC@123 | ADMINISTRATOR | — | MAY 12, 2022 20:00:02 | ADMINISTRATOR |
| 2 | UserA | mypass12345 | USER A | FINANCE DEPARTMENT | MAY 11, 2022 17:04:36 | GENERAL USER |
| 3 | UserB | 1111 | USER B | FINANCE DEPARTMENT | NOVEMBER 27, 2021 10:20:22 | GENERAL USER |
| 4 | UserC | 23456 | USER C | DEVELOPMENT DEPARTMENT | APRIL 28, 2022 14:51:04 | GENERAL USER |
| ⋮ | ⋮ | ⋮ | ⋮ | ⋮ | ⋮ | ⋮ |

FIG. 12

| SETTING ITEM NAME | | SETTABLE RANGE | SETTING CONTENT | |
|---|---|---|---|---|
| ⋮ | | ⋮ | ⋮ | |
| PASSWORD POLICY SETTING FUNCTION | | ENABLE/DISABLE | ENABLED | |
| ADMINISTRATOR | MINIMUM PASSWORD LENGTH | 0-32 | 8 | |
| | PASSWORD CREATION RULE | ENABLE/DISABLE | ENABLED | |
| | PROHIBITION OF REUSE OF UNCHANGED PASSWORD | ENABLE/DISABLE | ENABLED | |
| GENERAL USER | MINIMUM PASSWORD LENGTH | 0-32 | 5 | |
| | PASSWORD CREATION RULE | ENABLE/DISABLE | ENABLED | |
| | PROHIBITION OF REUSE OF UNCHANGED PASSWORD | ENABLE/DISABLE | ENABLED | |
| | POLICY CHECK FOR EACH USER/GROUP | ENABLE/DISABLE | ENABLED | ─ D200 |
| | USER | − | USER A | ─ D202 |
| | GROUP | − | DEVELOPMENT DEPARTMENT | ─ D204 |
| ⋮ | | ⋮ | ⋮ | |

FIG. 16

| ID | LOGIN NAME | PASSWORD | USER NAME | FUNCTION USED | | LAST LOGIN DATE AND TIME | USER CLASSIFICATION |
|---|---|---|---|---|---|---|---|
| | | | | COPY | COPY + OCR | | |
| 1 | Admin | ABC@123 | ADMINISTRATOR | – | ○ | MAY 12, 2022 20:00:02 | ADMINISTRATOR |
| 2 | UserA | mypass12345 | USER A | – | ○ | MAY 11, 2022 17:04:36 | GENERAL USER |
| 3 | UserB | 1111 | USER B | ○ | – | NOVEMBER 27, 2021 10:20:22 | GENERAL USER |
| 4 | UserC | 23456 | USER C | ○ | – | APRIL 28, 2022 14:51:04 | GENERAL USER |
| ⋮ | ⋮ | ⋮ | ⋮ | ⋮ | ⋮ | ⋮ | ⋮ |

FIG. 17

| SETTING ITEM NAME | | | SETTABLE RANGE | SETTING CONTENT | |
|---|---|---|---|---|---|
| ⋮ | | | ⋮ | ⋮ | |
| TIMING FOR POLICY CHECK | | | – | – | |
| ADMINISTRATOR | TIMING OF LOGIN | | ENABLED | ENABLED | D300 |
| | CONFIRMATION ACCORDING TO AUTHENTICATION MEANS | | ENABLED | ENABLED | D302 |
| | | QUICK AUTHENTICATION | ENABLED | ENABLED | |
| | | IC CARD AUTHENTICATION | ENABLED | ENABLED | |
| | TIMING OF PASSWORD REGISTRATION/ CHANGE AFTER SETTING CHANGE | | ENABLED | ENABLED | D304 |
| GENERAL USER (USING COPYING FUNCTION) | TIMING OF LOGIN | | ENABLE/DISABLE | DISABLED | D310 |
| | CONFIRMATION ACCORDING TO AUTHENTICATION MEANS | | ENABLE/DISABLE | DISABLED | D312 |
| | | QUICK AUTHENTICATION | ENABLE/DISABLE | – | |
| | | IC CARD AUTHENTICATION | ENABLE/DISABLE | – | |
| | TIMING OF PASSWORD REGISTRATION/ CHANGE AFTER SETTING CHANGE | | ENABLE/DISABLE | ENABLED | D314 |
| GENERAL USER (USING COPYING FUNCTION AND OCR FUNCTION) | TIMING OF LOGIN | | ENABLE/DISABLE | ENABLED | D320 |
| | CONFIRMATION ACCORDING TO AUTHENTICATION MEANS | | ENABLE/DISABLE | DISABLED | D322 |
| | | QUICK AUTHENTICATION | ENABLE/DISABLE | – | |
| | | IC CARD AUTHENTICATION | ENABLE/DISABLE | – | |
| | TIMING OF PASSWORD REGISTRATION/ CHANGE AFTER SETTING CHANGE | | ENABLE/DISABLE | ENABLED | D324 |
| ⋮ | | | ⋮ | ⋮ | |

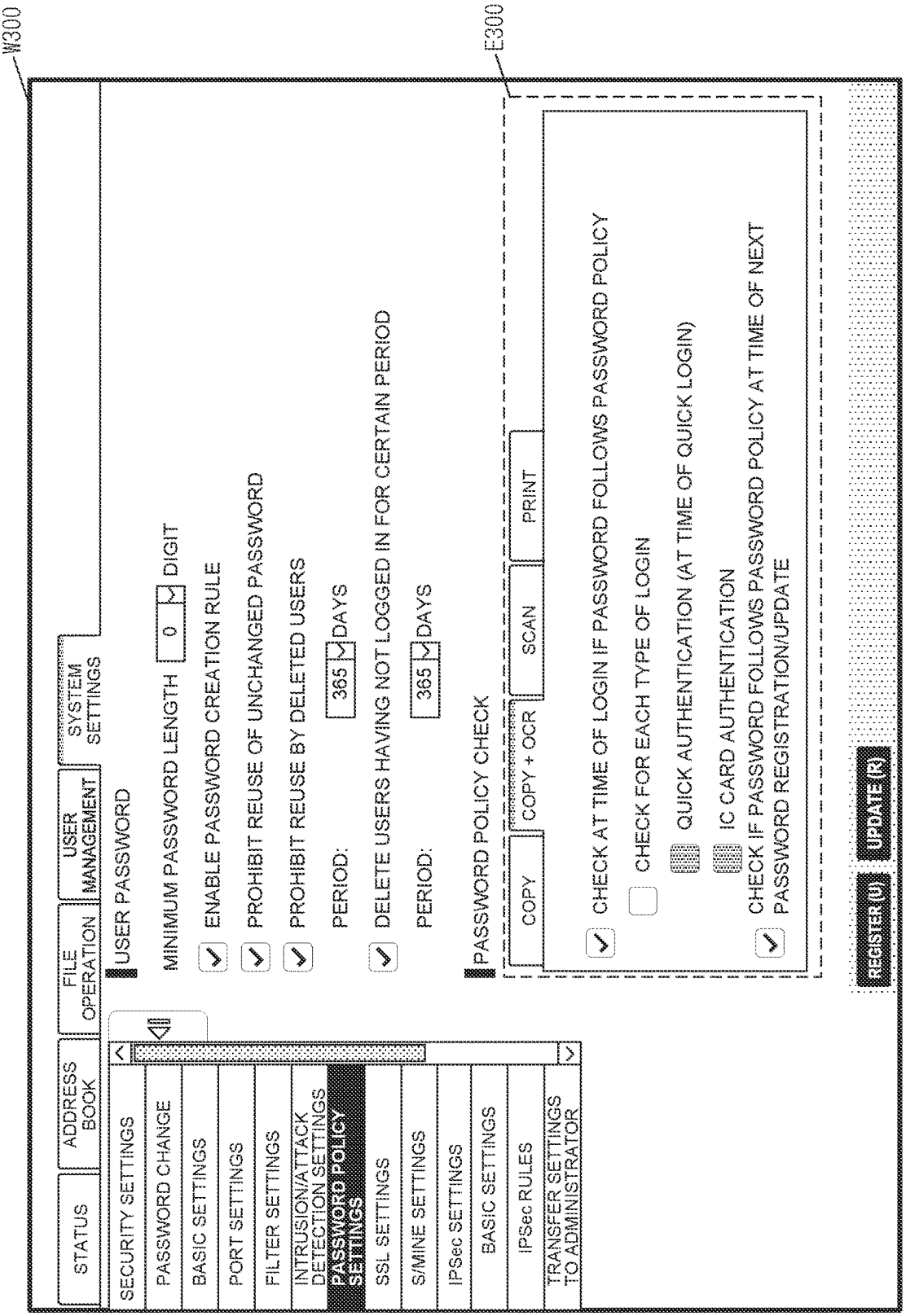

IMAGE FORMING APPARATUS AND DETERMINATION METHOD IN PROCESSING APPARATUS FOR DETERMINING WHETHER AUTHENTICATION INFORMATION SATISFIES AUTHENTICATION REQUIREMENT

BACKGROUND OF THE INVENTION

Field of the Invention

The present disclosure relates to an image forming apparatus and the like.

Description of the Background Art

In order to ensure security, some machines including image forming apparatuses are provided with functions to perform processing and control based on security policies, and technologies related to security policies have also been proposed. For example, a technology in which a security level designated by a user among security levels graded according to a security policy is set at once for all items subjected to a security check has been proposed.

One type of the security policy is a regulation (policy) on passwords. For example, in order to ensure security of machines, some machines have a function to provide a regulation (policy) on passwords, and when such a function is enabled, a check (policy check) is performed to confirm whether a password satisfies the policy. When placing importance on usability, an operation to perform the policy check only at the time of a password change and the time of new password registration is conceived. On the other hand, when placing importance on security, an operation to perform the policy check also at the time of user login in addition to the time of password change and the time of new password registration is conceived. Since what is more important, usability or security, depends on a user or a usage situation, a policy check appropriate to a user using the machine or a usage situation of the machine is desirably executed according to setting contents configured by a user. However, this problem is not considered in conventional art.

In view of the above-described problem, an object of an aspect of the present disclosure is to provide an image forming apparatus and the like, capable of appropriately performing a policy check.

SUMMARY OF THE INVENTION

In order to solve the above-described problem, an image forming apparatus according to an aspect of the present disclosure includes a storage storing authentication information on a user, a setter setting, for each user, an authentication requirement for the authentication information, an authenticator authenticating the user based on the authentication information, and a determiner performing determination as to whether the authentication information on a user authenticated by the authenticator satisfies the authentication requirement corresponding to the user.

A determination method in a processing apparatus according to another aspect of the present disclosure includes storing authentication information on a user, setting, for each user, an authentication requirement for the authentication information, authenticating the user based on the authentication information, and performing determination as to whether the authentication information on an authenticated user satisfies the authentication requirement corresponding to the user.

According to the aspect of the present disclosure, an image forming apparatus and the like, capable of appropriately performing a policy check can be provided.

BRIEF DESCRIPTION OF THE DRAWINGS

FIG. 3 is a diagram illustrating an example of a data structure of user information in the first embodiment.

FIG. 4 is a diagram illustrating an example of a data structure of deleted user information in the first embodiment.

FIG. 5 is a diagram illustrating an example of a data structure of a setting table in the first embodiment.

FIG. 11 is a diagram illustrating an example of a data structure of user information in a second embodiment.

FIG. 12 is a diagram illustrating an example of a data structure of a setting table in the second embodiment.

FIG. 16 is a diagram illustrating an example of a data structure of user information in a third embodiment.

FIG. 17 is a diagram illustrating an example of a data structure of a setting table in the third embodiment.

FIG. 20 is a diagram illustrating a screen example of a setting screen in the third embodiment.

DESCRIPTION OF THE PREFERRED EMBODIMENTS

Hereinafter, embodiments for carrying out the present disclosure will be described with reference to drawings. The following embodiments are examples for describing the present disclosure, and the technical scope of the present disclosure set forth in the claims is not limited to the description below.

1. First Embodiment

1.1 Functional Configuration

In a first embodiment, an image forming apparatus according to the present disclosure is applied to a multifunction machine 10. The multifunction machine 10 is also referred to as a multi-function peripheral/printer (MFP) and is provided with basic functions (a copying function, a printing function, a scanning function, etc.) as an MFP.

Figure 1:
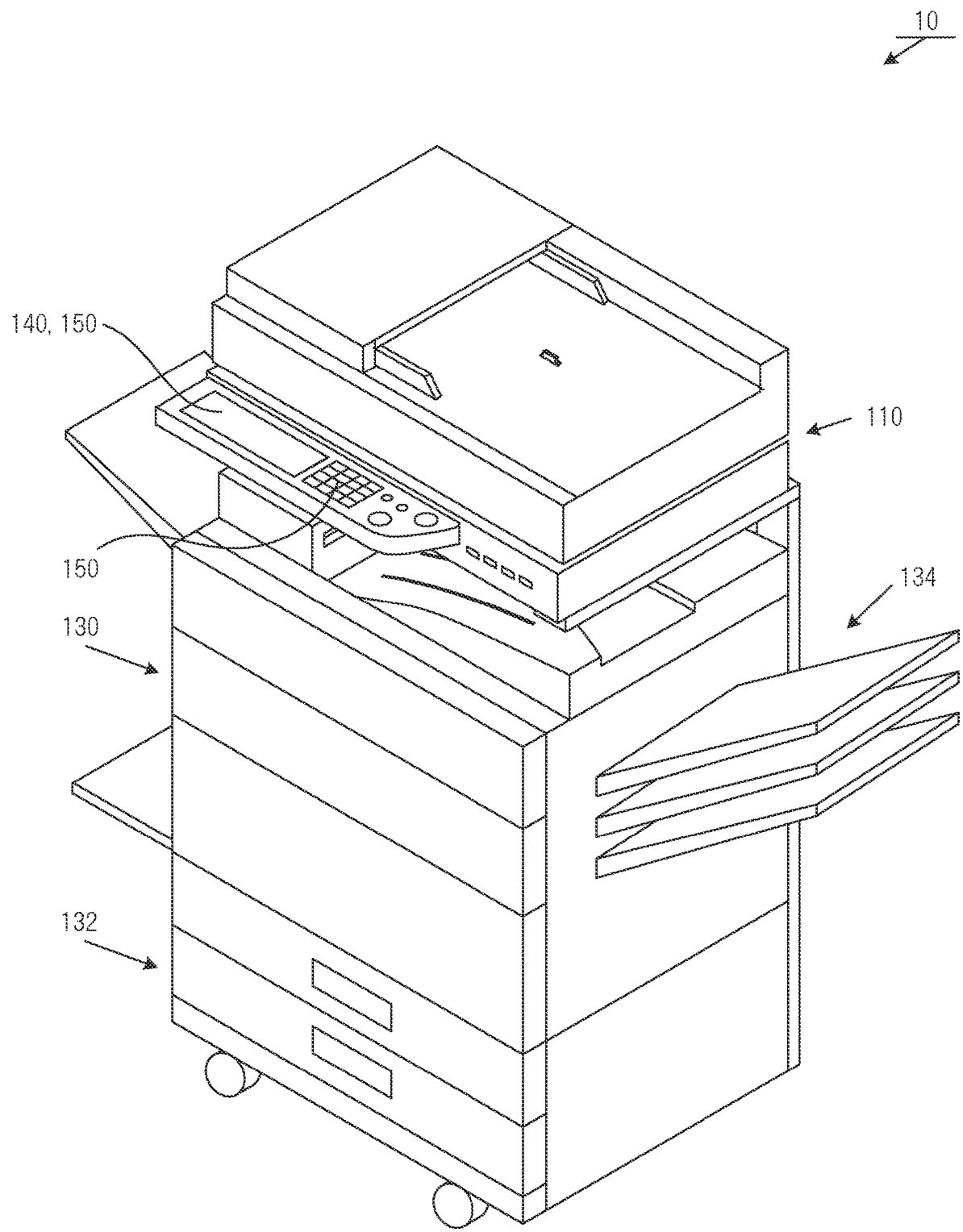
FIG. 1 is an external perspective view of an image forming apparatus in a first embodiment.
Figure 2:
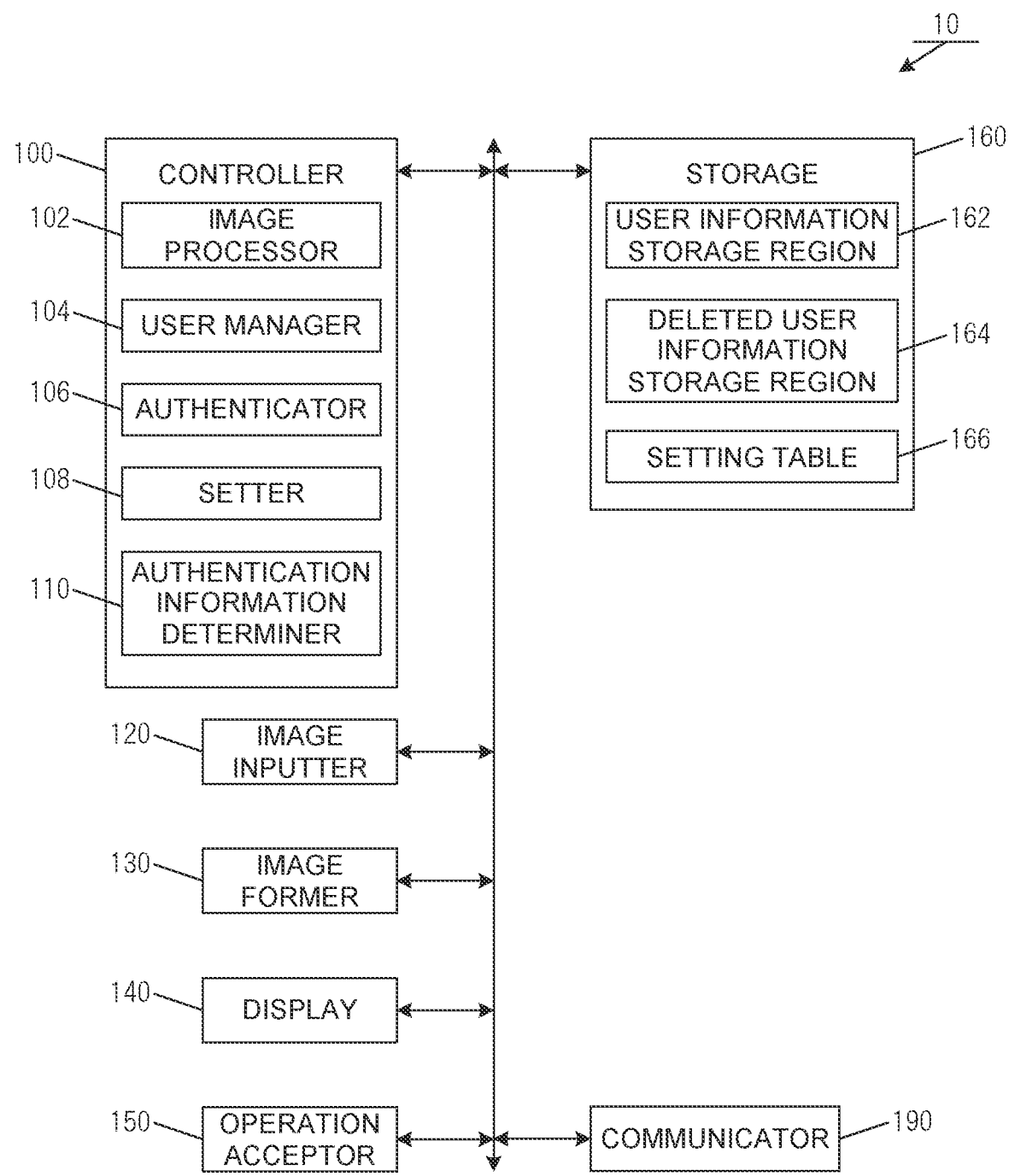
FIG. 2 is a diagram illustrating a functional configuration of the image forming apparatus in the first embodiment.

FIG. 1 is an external perspective view of the multifunction machine 10 according to the first embodiment, and FIG. 2 is a block diagram illustrating a functional configuration of the multifunction machine 10. As illustrated in FIG. 2, the multifunction machine 10 includes a controller 100, an image inputter 120, an image former 130, a display 140, an operation acceptor 150, a storage 160, and a communicator 190.

The controller 100 functions to control the overall multifunction machine 10. The controller 100 reads out and executes various programs stored in the storage 160 to implement various functions and includes, for example, one or more operation devices (central processing units (CPUs)). The controller 100 may be configured as a system on a chip (SoC) having a plurality of functions among those described below.

The controller 100 executes a program stored in the storage 160 to function as an image processor 102, a user manager 104, an authenticator 106, a setter 108, and an authentication information determiner 110.

The image processor 102 performs various types of image-related processing. For example, the image processor 102 executes a sharpening processing and tone conversion processing on an image input via the image inputter 120 or the communicator 190.

The user manager 104 manages users using the multifunction machine 10. For example, the user manager 104 manages users registered as a user utilizing the multifunction machine 10 by storing, in a user information storage region 162 described below, information (user information) on a user of the multifunction machine 10. The user information includes, in addition to user's own information such as the name of a user and privilege of the user, authentication information (a login name, a password, etc.) used to authenticate the user.

The user manager 104 manages users by updating and deleting a piece of stored user information. For example, when an operation of changing a password has been performed, the password is updated by storing a changed password as a piece of user information pertaining to a user whose password is to be changed.

When an operation of deleting a user has been performed, the user manager 104 deletes user information pertaining to the user to be deleted from the user information storage region 162 and stores information of the deleted user in a deleted user information storage region 164. If a user has not logged in to the multifunction machine 10 for a certain period, the user manager 104 may remove the user from users using the multifunction machine 10 by deleting the user information pertaining to the user. When an operation of registering a user has been performed, the user manager 104 stores user information pertaining to the user in the user information storage region 162. At this time, when the setting content for prohibiting reuse of the multifunction machine 10 by deleted users is "enabled" in a setting table 166 described below, and an operation of registering the same user as a user deleted within a set period has been performed, the user manager 104 may prohibit registration of the user.

The authenticator 106 authenticates a user to implement a user authentication function in the multifunction machine 10. For example, the authenticator 106 displays a login screen on the display 140, and when authentication information entered by a user through the login screen matches authentication information included in any pieces of user information preliminarily stored, the authenticator 106 authenticates the user corresponding to the authentication information as a user using the multifunction machine 10.

While the above-described authentication method is an authentication method called knowledge-based authentication, the authenticator 106 can use various authentication methods other than knowledge-based authentication. For example, the authenticator 106 can use an authentication method such as possession-based authentication and biometric authentication. The authenticator 106 may authenticate a user using an external device providing an authentication function, such as an authentication server. In this case, the authenticator 106 sends, to the authentication server, the authentication information entered by a user through the login screen and authenticates the user according to an authentication result received from the authentication server.

The setter 108 configures various settings (system settings) for the multifunction machine 10. For example, the setter 108 displays, on the display 140, a screen (setting screen) on which settings for the multifunction machine 10 are displayed or changed and applies settings on the multifunction machine 10 by storing contents input via the setting screen in the setting table 166 described below, according to a user operation.

The authentication information determiner 110 determines whether the authentication information on a user authenticated by the authenticator 106 satisfies an authentication requirement. The authentication requirement is a requirement for determining whether the authentication information used to authenticate a user is proper. The authentication requirement is a policy set by an administrator to ensure security of an organization or the like. The authentication requirement is sometimes referred to as a security policy, for example. The first embodiment is described, taking a password policy, which is a policy pertaining to passwords, as an example of the authentication requirement. For example, the authentication information determiner 110 determines whether a password included in the user information corresponding to an authenticated user satisfies the authentication requirement (password policy) on the password. The authentication requirement may be a policy pertaining to account names of users, a password change frequency and span, or an authentication method (for example, necessity of e-mail authentication), for example.

The image inputter 120 inputs an image into the multifunction machine 10. The image inputter 120 includes a scanner that reads a document placed on a document table, for example. The scanner is a device that converts an image into an electrical signal using an image sensor such as a charge coupled device (CCD) or a contact image sensor (CIS) and quantizes and encodes the electrical signal, for example. The image inputter 120 may include an interface (terminal) through which an image stored in a universal serial bus (USB) memory is read out, and read out the USB memory and input an image. The image inputter 120 may receive an image from another device via the communicator 190 and thereby input the image.

The image former 130 forms (prints) an image on a recording medium such as recording paper. The image former 130 includes, for example, a printing device such as a laser printer using an electrophotographic method. The image former 130 feeds recording paper from a feed tray 132 included in the multifunction machine 10, forms an image on a surface of the recording paper, and discharges the recording paper from a discharge tray 134 included in the multifunction machine 10, for example.

The display 140 displays various pieces of information. The display 140 includes, for example, a display device such as a liquid crystal display (LCD), an organic electro-luminescence (EL) display, or a micro light emitting diode (LED) display.

The operation acceptor 150 receives an operation instruction from a user using the multifunction machine 10. The operation acceptor 150 includes an input device such as a key switch (hard key) or a touch sensor. The touch sensor may detect an input through a contact (touch) by a common detection method such as a resistive method, an infrared method, an inductive method, or a capacitive method. A touch panel in which the display 140 and the operation acceptor 150 are integrally formed may be installed in the multifunction machine 10.

The storage 160 stores various programs and various data necessary for operation of the multifunction machine 10. The storage 160 includes, for example, a storage device such as a solid state drive (SSD), which is a semiconductor memory, or a hard disc drive (HDD).

The storage 160 allocates a user information storage region 162 and a deleted user information storage region 164 and stores a setting table 166.

The user information storage region 162 stores user information. As illustrated in FIG. 3, for example, the user information includes an ID (for example, "1") identifying a user, a login name (for example, "Admin") and a password (for example, "ABC@123"), a user name of the user (for example, "administrator a"), the last login date and time of the user (for example, "May 12, 2022 20:00:02"), and an authority classification of the user (for example, "administrator").

The login name and the password included in the user information are authentication information used to authenticate the user. The authority classification is information indicating authority of the user. In the first embodiment, one of "administrator" having authority to manage the multifunction machine 10 and "general user" having no authority to manage the multifunction machine 10 is stored as the authority classification.

The deleted user information storage region 164 stores information (deleted user information) on a user deleted from the multifunction machine 10. As illustrated in FIG. 4, for example, the deleted user information includes an ID (for example, "101") identifying a user, a login name (for example, "UserX") and a password (for example, "abc@789"), a user name of the user (for example, "user X"), the deletion date and time of the user (for example, "Apr. 1, 2022 17:00:00"), and an authority classification of the user (for example, "general user").

The setting table 166 stores information pertaining to settings of the multifunction machine 10. As illustrated in FIG. 5, for example, setting item names, settable ranges indicating ranges and types settable as setting contents for the respective setting items, and setting contents set for the respective setting items are associated with one another in the setting table 166. Default values are preliminarily stored as setting contents in the setting table 166, and the setting contents are updated by the setter 108, for example.

In the first embodiment, the setting table 166 includes the following settings.

A setting for the user authentication function

A setting for the password policy

A setting for timing (location) at which a check (policy check) as to whether a password of a user satisfies the password policy is performed The password policy is a regulation (policy, authentication requirement) on passwords, which are authentication information. Hereinafter, settings stored in the setting table 166 are described in detail.

Settings for User Authentication Function

The setting table 166 includes a setting concerning whether to enable the user authentication function (D100 in FIG. 5). In a case where the user authentication function is enabled, the authenticator 106 performs the user authentication, and the user is allowed to use the multifunction machine 10 when the user is authenticated. On the other hand, in a case where the user authentication function is disabled, the authenticator 106 does not perform the user authentication, and any users can use the multifunction machine 10.

Setting for Password Policy

The setting table 166 includes, as settings for the password policy, a setting concerning whether to enable the password policy setting function (D110 in FIG. 5), which is a function to set the password policy, and a setting of password policy contents (authentication requirements) (D120 in FIG. 5).

The password policy is a type of the security policy and indicates a requirement that a password, which is authentication information, needs to satisfy. In a case where the password policy setting function is enabled, the policy check is performed on passwords.

In the first embodiment, the following settings are stored for each authority classification as settings of password policy contents.

(1) Minimum Password Length

The minimum password length indicates the minimum length (string length or digit number) required as a password length. The minimum password length can be set for each of a user whose authority is classified as "administrator" (D122a in FIG. 5) and a user whose authority is classified as "general user" (D122b in FIG. 5). The case where the minimum password length is "0" indicates that there is no requirement on the password length, and passwords with any lengths can be set.

(2) Password Creation Rule

A password creation rule indicates whether a password created by a user needs to follow a predetermined rule. For example, when the password creation rule is "enabled", restriction on types of characters that must be included in a password, such as a need to follow a rule requiring each password to include at least one numeric character, one upper case character, one lower case character, and one symbol character is imposed. When the password creation rule is "disabled", there is no restriction on types of characters required to be included in a password. The password creation rule can be set for each of a user whose authority is classified as "administrator" (D124a in FIG. 5) and a user whose authority is classified as "general user" (D124b in FIG. 5).

(3) Prohibition of Reuse of Unchanged Passwords

A prohibition of reuse of unchanged passwords indicates whether the same password as the currently set password can be set again. The prohibition of reuse of unchanged passwords can be set for each of a user whose authority is classified as "administrator" (D126a in FIG. 5) and a user whose authority is classified as "general user" (D126b in FIG. 5).

Setting for Timing to Perform Policy Check

The setting table 166 includes a setting for timing (location) to perform the policy check (D130 in FIG. 5). In the first embodiment, the timing for the policy check is (1) the timing of login and (2) the timing of password registration/change, and whether to perform the policy check can be set, respectively.

(1) Timing of Login

When the policy check at the time of login is "enabled", after a password is set by a user, whether the password of the user to log in satisfies the password policy is checked at the time when the user logs in to the multifunction machine 10. When the password of the user does not satisfy the password policy, the user login is disabled (denied). Whether to perform the policy check at the time of login can be set for each of a user whose authority is classified as "administrator" (D132*a* in FIG. 5) and a user whose authority is classified as "general user" (D132*b* in FIG. 5).

Although a login method using login names and passwords (login name/password authentication) is used as the method (authentication method) to log in to the multifunction machine 10, login methods other than the login name/password authentication may be used.

Login methods other than the login name/password authentication include the following methods.

Quick authentication (quick login)

In quick authentication, the display 140 displays a list of users capable of logging in to the multifunction machine 10 with a list or icons at the time of login, and selected users are authenticated and allowed to log in.

IC card authentication (IC card login)

In IC card authentication, an IC card is read by the multifunction machine 10 at the time of login, and when the information read from the IC card is appropriate, a user based on the information is authenticated and allowed to log in.

The IC card authentication is one type of possession-based authentication, and possessions of a user used for authentication may be anything other than IC cards. Possession-based authentication such as IC card authentication may be combined with knowledge-based authentication. For example, IC card authentication includes the following combinations of authentication.

IC card+login name/password

IC card+login name/password+e-mail address

IC card+user number

The user number is a number that specifies a user, is preliminarily issued for a user using the multifunction machine 10, and is preliminarily stored in the multifunction machine 10. A login method (user number authentication) using only user numbers may be exempt from (without setting) the policy check because a password input screen is not displayed.

When various login methods as described above are used, whether to perform the policy check can be set for each login (each authentication time) to the multifunction machine 10. The setting concerning whether to perform the policy check according to authentication means can be set for each of a user whose authority is classified as "administrator" (D134*a* in FIG. 5) and a user whose authority is classified as "general user" (D134*b* in FIG. 5).

Whether to perform the policy check may be settable for each login method. For example, the policy check can be set such that the policy check is performed when quick authentication is used, and no policy check is performed when IC card authentication is used. In this case, when a login method performing the policy check is used, and the password of a user logging in does not satisfy the password policy, the multifunction machine 10 disables (denies) the user login. The setting concerning whether to perform the policy check for each login method can be set for each of a user whose authority is classified as "administrator" (D136*a* in FIG. 5) and a user whose authority is classified as "general user" (D136*b* in FIG.

(2) Timing of Next Password Registration/Change after Changing Password Policy Setting For example, in a case where the multifunction machine 10 is already used by a user, and the password policy setting function has been changed from a disabled state to an enabled state, or the content of the password policy has been changed, it is required to register a password or change a registered password. In such a case, if the setting is "enabled", the policy check is performed on a changed password at the time of next password registration/change after the password policy setting has changed such as a case where the password policy setting function has been changed to an enabled state. When the changed password does not satisfy the policy check at the time of password registration/change, a message such as a warning is displayed, and password change is urged again, but login to the multifunction machine 10 is allowed, for example.

Whether to perform the policy check at the time of next password registration/change after changing the password policy setting can be set for each of a user whose authority is classified as "administrator" (D138*a* in FIG. 5) and a user whose authority is classified as "general user" (D138*b* in FIG. 5).

The setting for the timing for the policy check on a user whose authority is classified as "administrator" may be always fixed at an "enabled" state, as illustrated in FIG. 5, and the policy check is always performed at the time of login and at the time of password registration/change. On the other hand, the setting for the timing for a policy check on a user whose authority is classified as "general user" is selectable from an enabled state and a disabled state and can be set according to a usage situation of the multifunction machine 10.

As such, the multifunction machine 10 stores the above-described setting in the setting table 166 and thus can set in detail the timing (location) to perform the policy check.

The setting table 166 may further include a setting (D140 in FIG. 5) concerning whether to delete, from the multifunction machine 10, the registration of a general user having not logged in for a certain period. When the setting to delete, from the multifunction machine 10, the registration of a general user having not logged in for a certain period is enabled, user information on a user having not logged in to the multifunction machine 10 beyond a set period is deleted by the user manager 104. The setting table 166 may include a setting (D150 in FIG. 5) concerning whether to prohibit reuse of the multifunction machine 10 by a deleted user. When the setting to prohibit reuse of the multifunction machine 10 by a deleted user is enabled, a user corresponding to deleted user information cannot be registered again as a user of the multifunction machine 10 within a set period.

The communicator 190 communicates with other devices and equipment via a network such as a local area network (LAN) or a wide area network (WAN). The communicator 190 includes, for example, a communication module or a communication device such as a network interface card (NIC) used in a wired/wireless LAN. The communicator 190 may have an interface (network I/F) capable of being connected to a network. The communicator 190 may be connected to a communication network such as a public network, a LAN, or the internet and may be capable of sending data externally by a communication method such as facsimile or an e-mail via a communication network.

1.2 Processing Flow

Figure 6:
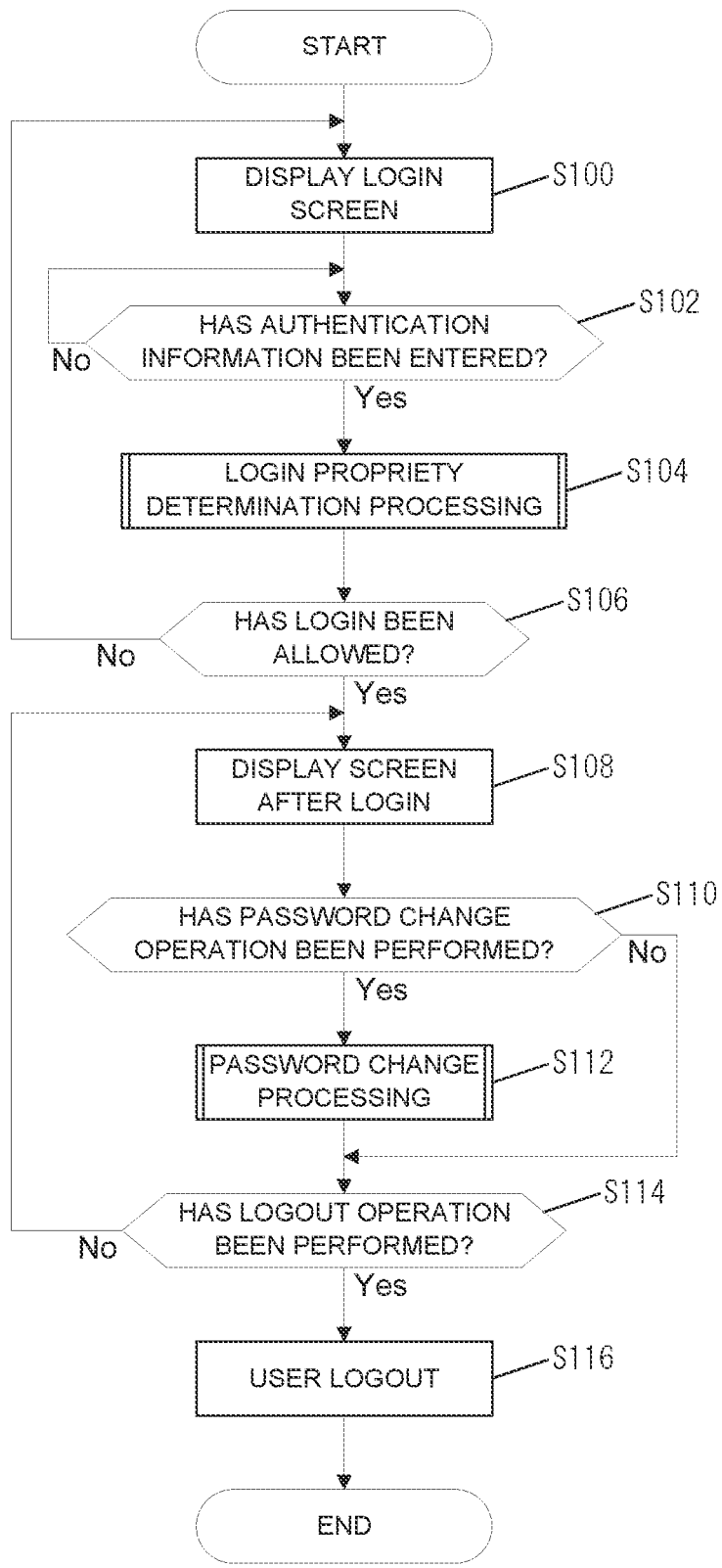
FIG. 6 is a flowchart of main processing in the first embodiment.
Figure 7:
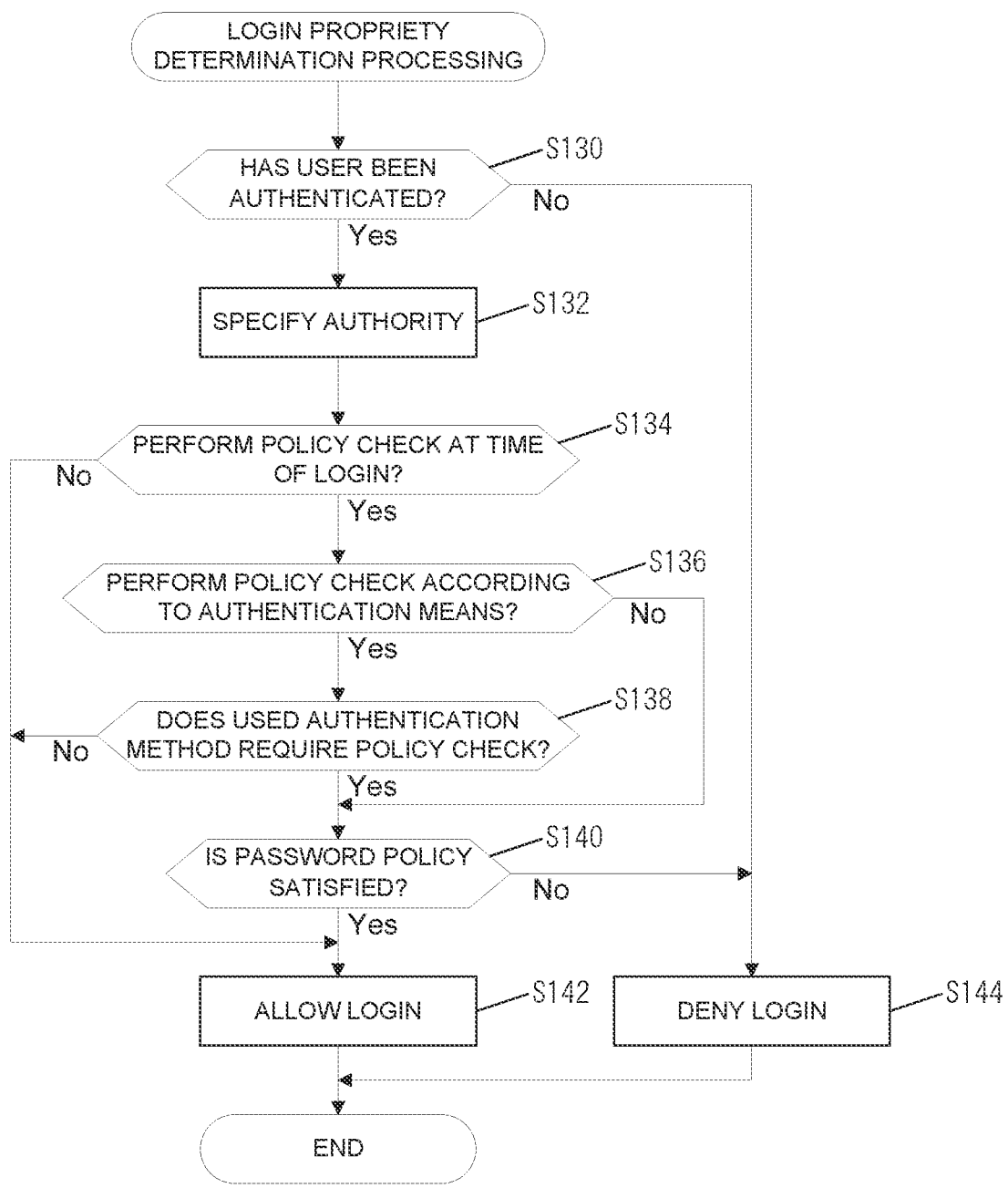
FIG. 7 is a flowchart of login propriety determination processing in the first embodiment.
Figure 8:
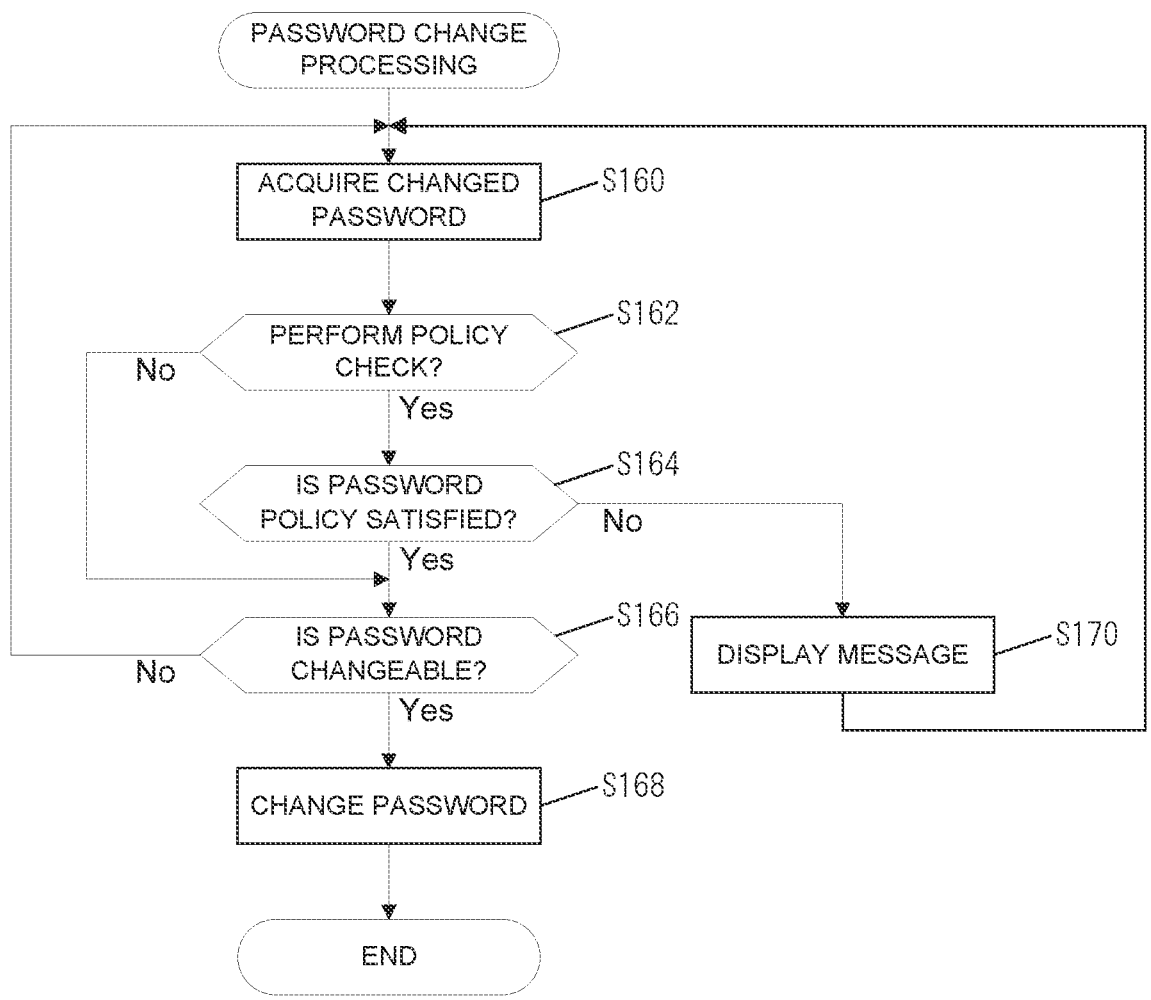
FIG. 8 is a flowchart of password change processing in the first embodiment.

Processing executed by the multifunction machine 10 will be described with reference to FIG. 6 to FIG. 8. The processing illustrated in FIG. 6 to FIG. 8 is executed by the controller 100 reading out a program stored in the storage 160, for example. The following description will be made, assuming that the user authentication function and the password policy setting function are both "enabled".

In the following description, the policy check checks whether a password, which is authentication information included in user information, matches the password policy (authentication requirement), which is a regulation (policy) against the password.

1.2.1 Main Processing

A flow of main processing executed by the multifunction machine 10 will be described with reference to FIG. 6. First, the controller 100 (authenticator 106) displays a login screen (step S100) on the display 140.

The controller 100 (authenticator 106) determines whether authentication information has been entered (step S102). The authentication information entered is information according to the authentication means used by the authenticator 106 and indicates a combination of a login name and a password, information read from an IC card, and an item selected from a user list displayed on the login screen. When no login operation is performed, the authenticator 106 repeats the processing of step S102 (step S102; No).

On the other hand, when authentication information is entered, the controller 100 authenticates a user on the basis of the authentication information and executes login propriety determination processing to determine whether to allow the user to log in to the multifunction machine 10 (step S102; Yes→step S104). The login propriety determination processing will be described below.

The controller 100 then determines whether the login is allowed (step S106). When the login has not been allowed, the controller 100 returns the processing to step S100 (step S106; No→step S100).

On the other hand, when the login has been allowed, the controller 100 allows the user authenticated in step S104 to log in to the multifunction machine 10 and displays a screen after login on the display 140 (step S106; Yes→step S108). The screen after login is a screen on which a user having logged in to the multifunction machine 10 operates the multifunction machine 10, such as a home screen, a job execution screen, or a setting screen.

Next, the controller 100 determines whether a password change operation has been performed (step S110). The password change operation is, for example, an operation to cause the display 140 to display a setting screen and register, on the multifunction machine 10, a changed password entered on the setting screen.

When the password change operation has been performed, the controller 100 executes password change processing to change the password (step S110: Yes→step S112). The password change processing will be described below.

When the password change operation has not been performed, the controller 100 omits the processing of step S112 (step S110: No).

Next, the controller 100 determines whether a logout operation has been performed by a user (step S114). When the logout operation has been performed, the controller 100 causes the user logging in to multifunction machine 10 log out (step S114: Yes→step S116). On the other hand, when the logout operation has not been performed, the controller 100 returns the processing to step S108 (step S114: No→step S108).

1.2.2 Login Propriety Determination Processing

The login propriety determination processing will be described with reference to FIG. 7. First, the controller 100 (authenticator 106) authenticates the user based on the authentication information entered in step S102 in FIG. 6 and determines whether the user has been authenticated (step S130).

When the user has been authenticated, the controller 100 (authentication information determiner 110) performs the policy check according to the authority of the user on the basis of the setting contents stored in the setting table 166. First, the controller 100 (authentication information determiner 110) specifies the authority of the authenticated user (step S130; Yes→step S132). For example, the authentication information determiner 110 reads out the authority classification stored in the user information of the authenticated user in step S130 to specify the authority of the user.

Next, the controller 100 (authentication information determiner 110) determines whether to perform the policy check at the time of login (step S134). For example, the authentication information determiner 110 refers to the setting table 166 and, when the setting to perform the policy check at the time of login on users belonging to the authority specified in step S132 is "enabled", determines to perform the policy check at the time of login. On the other hand, when the setting is "disabled", the authentication information determiner 110 determines not to perform the policy check at the time of login.

When the policy check is performed at the time of login, the controller 100 (authentication information determiner 110) refers to the setting table 166 and determines whether to perform the policy check on the user belonging to the authority specified in step S132 according to authentication means (step S134; Yes→step S136).

When the policy check is performed according to authentication means, the controller 100 (authentication information determiner 110) refers to the setting table 166 and determines whether the authentication method used by the user requires the policy check (step S136; Yes→step S138).

When the authentication method used by the user requires the policy check, the controller 100 (authentication information determiner 110) determines whether the password of the user authenticated in step S130 satisfies the password policy (step S138; Yes→step S140). For example, the authentication information determiner 110 refers to the setting table 166, reads out the setting for the password policy against the authority of the user authenticated in step S130, and determines whether the password of the user satisfies the password policy. In this case, whether the length of the password of the user is the minimum password length or more and/or the password of the user satisfies the password creation rule is determined. When the password of the user satisfies all contents set as the password policy, the authentication information determiner 110 determines that the password policy is satisfied. On the other hand, when the password of the user does not satisfy even one of the contents set as the password policy, the authentication information determiner 110 determines that the password policy is not satisfied.

When the password of the user authenticated in step S130 satisfies the password policy, the controller 100 (authentication information determiner 110) allows the user to log in (step S140; Yes→step S142). On the other hand, when the password of the user authenticated in step S130 does not satisfy the password policy, the controller 100 (authentication information determiner 110) denies login and disallows the user to log in (step S140; No→step S144).

For example, when the length of the password entered, at the time of login, by the user authenticated in step S130 is three digits, and the password policy setting function is enabled, with the minimum password length being five digits, the password of the user does not satisfy the password policy. In this case, the user cannot log in to the multifunction machine 10.

Since login to the multifunction machine 10 is not allowed when the password does not satisfy the password policy, the password needs to be changed. Therefore, when the password does not satisfy the password policy, the controller 100 (authentication information determiner 110) may display, on the display 140, a massage urging the administrator of the multifunction machine 10 to request a password change, for example. The controller 100 (authentication information determiner 110) may notify the administrator and the like of the multifunction machine 10 that there is a user who cannot log in to the multifunction machine because the password policy is not satisfied. In this way, the authentication information determiner 110 can prompt the user to take necessary action to log in to the multifunction machine 10 even if users who could not log in to the multifunction machine 10 because the password policy is not satisfied have no way to change passwords.

When the controller 100 (authentication information determiner 110) determines not to perform the policy check according to authentication means in step S136, the controller 100 (authentication information determiner 110) omits step S138 and executes the processing of step S140 (step S136; No→step S140). That is, when no policy check according to authentication means is performed, the authentication information determiner 110 performs the policy check on the password of the user authenticated in step S130 irrespective of the authentication means used by the user.

When the controller 100 (authentication information determiner 110) determines not to perform the policy check at the time of login in step S134 (step S134; No), the controller 100 (authentication information determiner 110) omits the policy check and allows login. Similarly, when the authentication method used by the user in step S138 is not authentication means requiring the policy check (step S138; No), the controller 100 (authentication information determiner 110) omits the policy check and allows login. In this case, the policy check on the password of the user authenticated in step S130 is omitted, and the user is directly allowed to log in.

When the user has not been authenticated in step S130, the controller 100 (authenticator 106) denies the user login (step S130; No→step S144).

The controller 100 (authentication information determiner 110) performs the policy check by executing the above processing in the following cases.

The case where the policy check is performed at the time of login, and no policy check according to authentication means is performed.

The case where the policy check is performed at the time of login, and the policy check according to authentication means is performed, and when authentication means subjected to the security check is used.

On the other hand, the controller 100 (authentication information determiner 110) performs no policy check in the following cases.

The case where no policy check is performed at the time of login.

The case where the policy check is performed at the time of login, and the policy check according to authentication means is performed, and when authentication means not subjected to the security check is used.

In this way, the controller 100 (authentication information determiner 110) can perform the policy check according to the authority and login method at the time of user login. A user for which a password that does not satisfy the password policy is set can be disallowed to log in.

1.2.3 Password Change Processing

Password change processing will be described with reference to FIG. 8. First, the controller 100 (user manager 104) displays a screen for changing/registering a password on the display 140 and acquires a changed password entered via the screen (step S160).

Next, the controller 100 (authentication information determiner 110) determines whether to perform the policy check (step S162). For example, when the password policy setting has been changed, the authentication information determiner 110 refers to the setting table 166 and reads out whether the setting to perform the policy check at the time of next password registration/change after changing the password policy setting is enabled with respect to the authority of the user (logged-in user) authenticated in step S130 in FIG. 7. When the read setting is "enabled", the authentication information determiner 110 determines to perform the policy check at the time of a password change, and when the read setting is "disabled", the authentication information determiner 110 determines not to perform the policy check at the time of password change. On the other hand, when the setting of the password policy is not changed before password registration/change or when the setting to perform the policy check at the time of next password registration/change after changing the password policy setting is disabled, the authentication information determiner 110 determines not to perform the policy check at the time of a password change.

In the case where the policy check is performed, the controller 100 (authentication information determiner 110) determines whether the changed password acquired in step S160 satisfies the password policy corresponding to the authority of the logged-in user (step S162; Yes→step S164). For example, the authentication information determiner 110 reads out the password policy setting corresponding to the authority of the logged-in user from the setting table 166 and determines whether the changed password satisfies the read setting content (requirement that the password needs to satisfy).

When the changed password satisfies the password policy, the controller 100 (user manager 104) determines whether the password is changeable (step S164; Yes→step S166). Examples of cases where the password is changeable are as follows.

The case where reuse of unchanged passwords is not prohibited.

The case where reuse of unchanged passwords is prohibited, and the password before change is different from the password after change.

When the password is changeable, the controller 100 (user manager 104) changes the password (step S166; Yes→step S168). For example, the user manager 104 stores the password acquired in step S160 as a password for the user information on the logged-in user.

On the other hand, when the password is unchangeable, the controller 100 returns the processing to step S160 (step S166; No→step s160). At this time, the controller 100 may display a message indicating that reuse of passwords is prohibited on the display 140.

When the controller 100 (authentication information determiner 110) determines that the password does not satisfy the password policy in step S164, the controller 100 (authentication information determiner 110) displays, on the display 140, a message (warning) indicating that the password does not satisfy the password policy (step S164; No→Step S170). The message may include a text urging to change the password again (re-enter the password). The controller 100 returns the processing to step S160 after the processing of step S170.

When the controller 100 (user manager 104) determines not to perform the policy check in step S162, the controller 100 (user manager 104) omits the processing of step S164 and executes the processing of step S166 (step S162; No→step S166). In this case, the password of the logged-in user is changed to the password acquired in step S160 without performing the policy check on the changed password when the password is changeable.

In this way, the controller 100 (authentication information determiner 110) can perform the policy check at the time of password registration/change according to the authority of the logged-in user. The controller 100 can avoid registering passwords that do not satisfy the password policy through the policy check performed by the authentication information determiner 110.

As such, by executing the processing illustrated in FIG. 6 to FIG. 8, the controller 100 can perform the policy check, according to the authority of the user using the multifunction machine 10, on the password of the user at timing set as the timing to perform the policy check among the logging-in timing, password registering/changing timing, etc. Note that the order of the steps may be changed, or some steps may be omitted from those described above to the extent that there is no contradiction.

1.3 Operation Example

Figure 9:
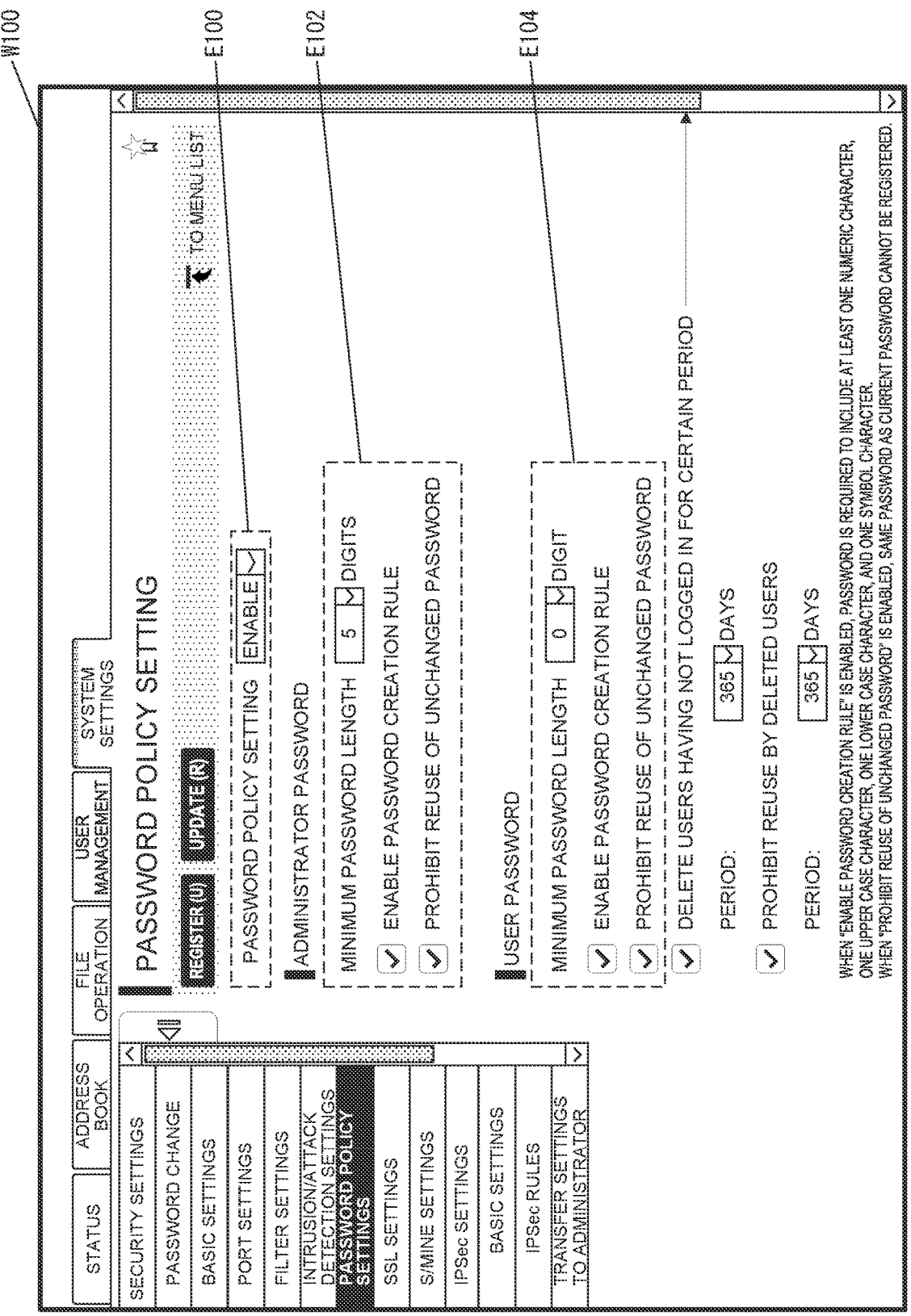
FIG. 9 is a diagram illustrating a screen example of a setting screen in the first embodiment.
Figure 10:
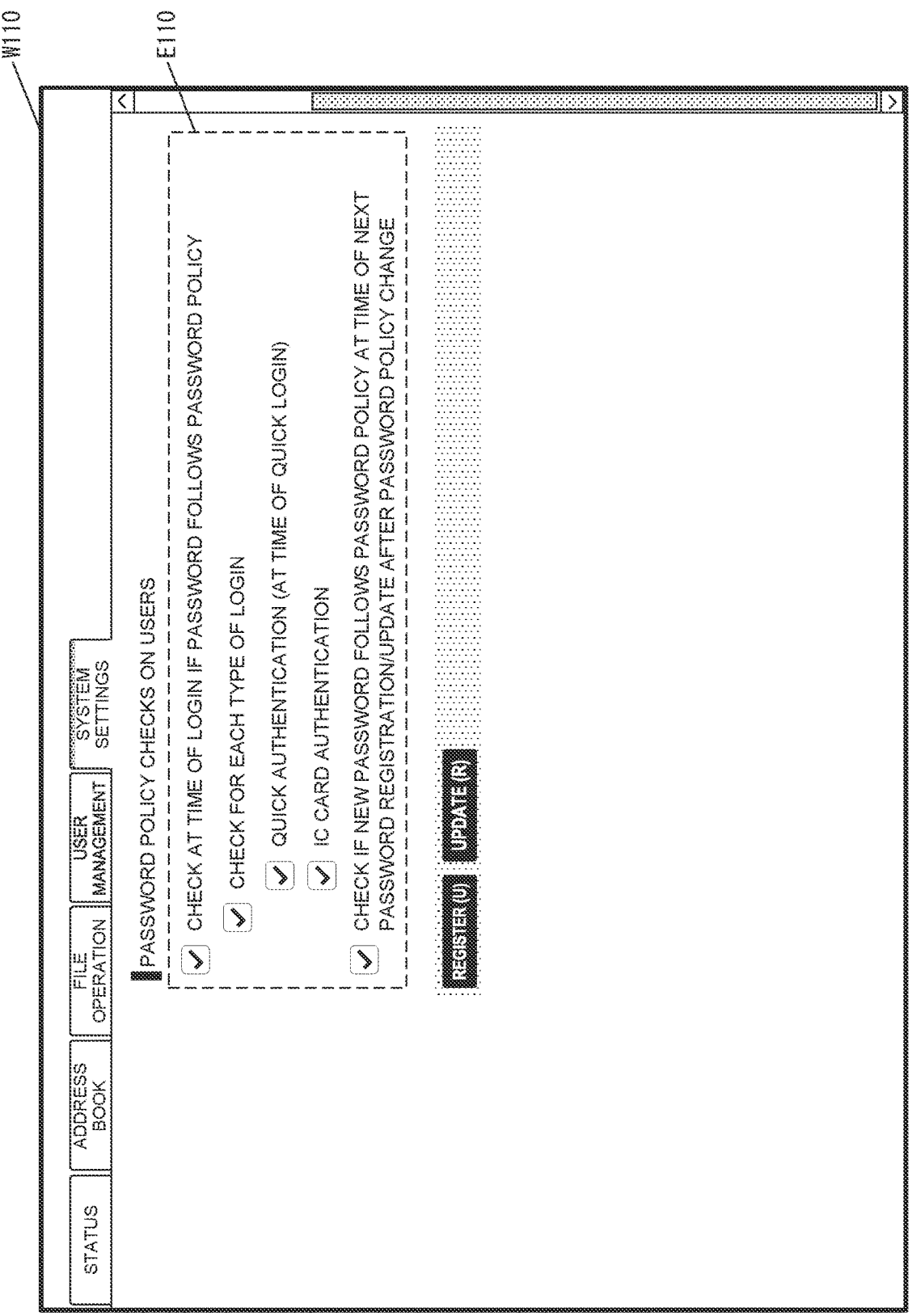
FIG. 10 is a diagram illustrating a screen example of the setting screen in the first embodiment.

An operation example of the first embodiment will be described with reference to FIG. 9 and FIG. 10. FIG. 9 and FIG. 10 are diagrams illustrating an example of a setting screen, and the screen illustrated in FIG. 9 and the screen illustrated in FIG. 10 are assumed to be continued.

The setting screen W100 illustrated in FIG. 9 includes a region E100 in which whether to enable the password policy setting function is set. The setting screen W100 also includes a region E102 in which the contents of the password policy for a user whose authority is classified as "administrator" is set; and a region E104 in which the contents of the password policy for a user whose authority is classified as "general user" is set.

The setting screen W110 illustrated in FIG. 10 includes a region E110 in which the timing for the policy check on a user whose authority is classified as "general user" is set. A user such as an administrator of the multifunction machine 10 can configure, via the setting screen W100 and the setting screen W110, the setting for the password policy and the setting for the timing for the policy check.

Next, usage situations and setting examples of the multifunction machine 10 of the first embodiment will be described. The timing for the policy check on a user whose authority is classified as "general user" is set by setting contents from setting 1 to setting 3 below.

Setting 1: The policy check is performed at the time of login

Setting 2: The policy check is performed at the time of next password registration/change after changing the password policy setting Setting 3: The policy check is performed when various login methods are used Quick login and IC card authentication are assumed to be used as a login method.

The following examples are described as usage situation examples.

Example 1: A Case where the Multifunction Machine 10 is Used in a Government Organization and the Like Placing Importance on Security Example 2: A Case where a Single Multifunction Machine 10 is Used in a Shared Office Situation and the Like where Multiple Companies Share a Single Room In the case of example 1, security performance of the multifunction machine 10 can be enhanced by setting all items from setting 1 to setting 3 above to be "enabled".

In the case of example 2, the security level is considered to be lowered to some extent because convenience is impaired when security is strengthened. For example, only setting 2 is enabled. That is, the policy check is performed only at the time of next password registration/change when the setting for the password policy has been changed.

In the above description, whether passwords satisfy the password policy is checked as the policy check; however, other items (target items) subjected to a security check may be checked. For example, other items subjected to a security check may be e-mail addresses. In this case, whether an e-mail address is registered, or whether the number of registered e-mail addresses is a predetermined number or more may be checked as the policy check on an e-mail address. E-mail addresses may be authentication information. Authentication information other than e-mail addresses may be an item subjected to a security check.

An item subjected to a security check may be user registration information. In this case, whether the department name or contact name pertaining to a user is registered or whether an icon (face photo or the like) pertaining to a user is registered may be checked as the policy check on the user registration information. Multiple items may be subjected to the policy check.

In the above description, the type of user authority is either "administrator" or "general user"; however, types of authority may be designed and set, as appropriate, and settings for the security policy may be configured according to the type of authority.

As such, in order to ensure security of the machine, the multifunction machine of the first embodiment has the function to provide a regulation (policy) on passwords, and can set the location at which whether passwords follow the policy is checked on the setting screen on which the policy can be set to be enabled/disabled, for example. That is, the multifunction machine of the first embodiment provides a setter that configures settings for the policy check, such as a setting screen, and executes the policy check according to the contents set by the setter.

In particular, by enabling settings for each user according to authority, the multifunction machine of the first embodiment can adjust in detail the extent to which the policy is checked for each usage situation for the machine and can adjust the security level for each target item and each user. Consequently, the multifunction machine of the first embodiment achieves the policy check according to users/ usage situations, and makes it possible to ensure security, while ensuring convenience of the multifunction machine for each usage situation of the multifunction machine. Users can adjust the extent to which the password policy is to be checked in detail according to the usage situation (installation location or the like) of the multifunction machine by, for example, the timing for the policy check.

The multifunction machine of the first embodiment can set, for each user, a requirement (minimum password length, types of characters that must be included, etc.) on a password (authentication information), which is an item subjected to the security check, according to the authority of each user. The multifunction machine of the first embodiment can set in detail, for each user, the location (timing) at which the policy check is performed according to user authority. The multifunction machine of the first embodiment can thereby adjust, for each user, the security level to be applied to an item subjected to the security check, instead of collectively setting the security level for all users. Multiple items may be subjected to the security check, and the security level applied can be designated for each item subjected to the security check.

2. Second Embodiment

Next, a second embodiment will be described. In the second embodiment, whether to perform the policy check can be selected for each user in addition to the functions described in relation to the first embodiment. In the second embodiment, FIG. 3 for the first embodiment is replaced with FIG. 11, FIG. 5 for the first embodiment is replaced with FIG. 12, FIG. 7 for the first embodiment is replaced with FIG. 13, and FIG. 8 for the first embodiment is replaced with FIG. 14. Note that the same process is denoted by the same reference sign, and description thereof is omitted.

2.1 Functional Configuration

FIG. 11 is a diagram illustrating an example of user information in the second embodiment. The user information in the second embodiment differs from the user information in the first embodiment in that the user information in the second embodiment includes a group name (for example, "finance department") indicating a group to which a user belongs in addition to the user information in the first embodiment shown in FIG. 3. A user may not belong to any groups or may belong to multiple groups. Information indicating a group to which a user belongs may be information other than group names, as long as the information can specify the group, such as a group ID.

FIG. 12 is a diagram illustrating an example of a setting table 166 in the second embodiment. The setting table 166 in the second embodiment further stores, as a setting for the password policy, a setting (D200 in FIG. 12) concerning whether to perform the policy check for each user or each group registered in the multifunction machine 10, compared with the setting table 166 in the first embodiment illustrated in FIG. 5.

The setting table 166 also stores a user (D202 in FIG. 12) subjected to the policy check and a group (D204 in FIG. 12) subjected to the policy check. When the setting to perform the policy check for each user or each group is "enabled", the policy check is performed only on a user or a group subjected to the policy check. In the second embodiment, a user or a group subjected to the policy check can be designated among users whose authority is classified as "general user". That is, in the second embodiment, all users whose authority is classified as "administrator" are subjected to the policy check.

2.2 Processing Flow

2.2.1 Login Propriety Determination Processing

Figure 13:
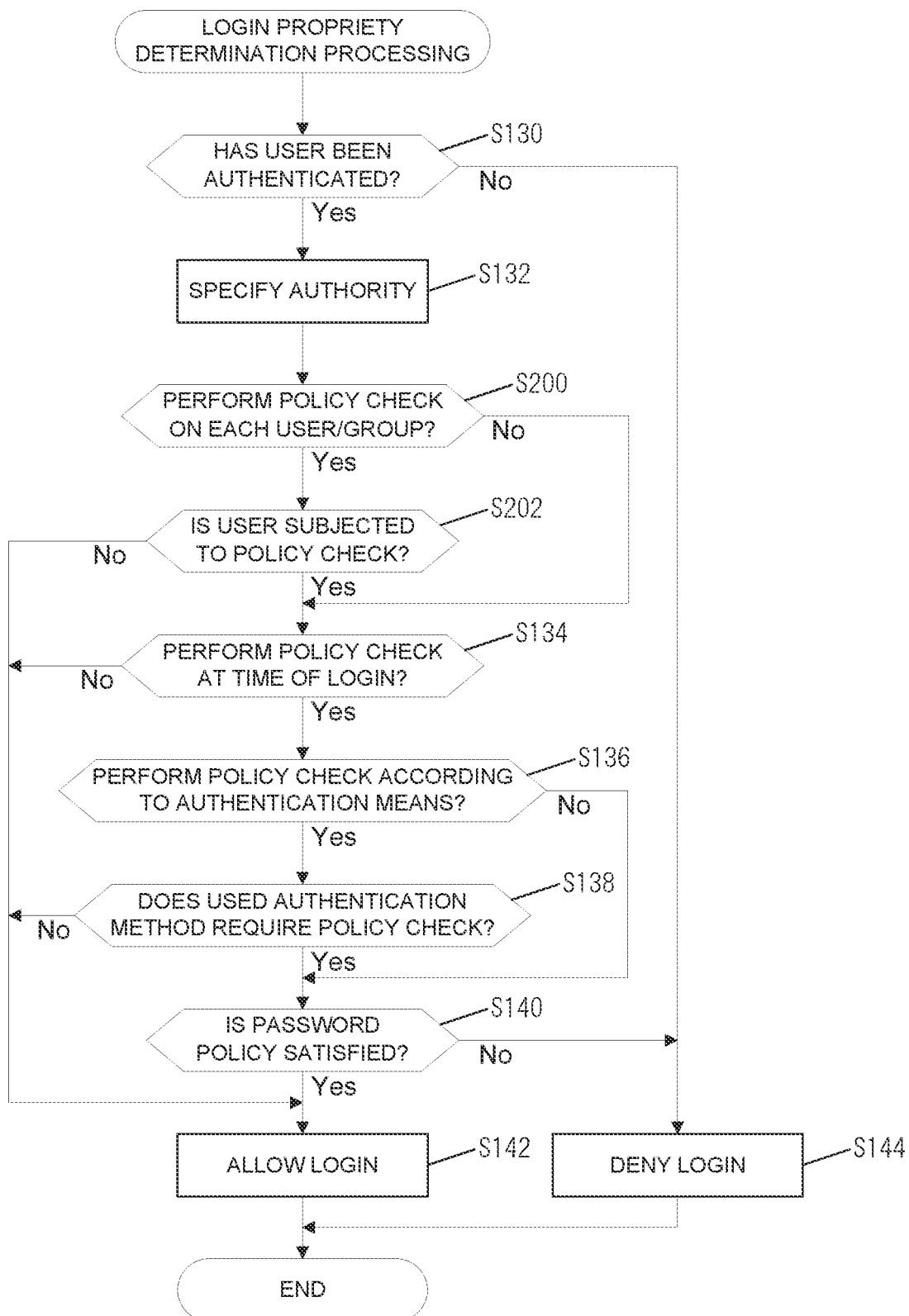
FIG. 13 is a flowchart of login propriety determination processing in the second embodiment.

The login propriety determination processing in the second embodiment will be described with reference to FIG. 13. The following description will be made, assuming that a user or a group subjected to the policy check among users whose authority is classified as "general user" is preliminarily set, and all users whose authority is classified as "administrator" are also subjected to the policy check.

In the second embodiment, after performing the processing of step S132, the controller 100 (authentication information determiner 110) refers to the setting table 166 and determines whether to perform the policy check for each user or each group (step S200).

When the policy check is performed on each user or each group, the controller 100 (authentication information determiner 110) determines whether the user authenticated in step S130 is a user subjected to the policy check (step S200; Yes→step S202). For example, in any one of the following cases, when the information shown in FIG. 12 is stored in the setting table 166, the authentication information determiner 110 determines that the user is subjected to the policy check.

- The case where the authority specified in step S132 is "administrator".
- The case where the authority specified in step S132 is "general user", and the user authenticated in step S130 is a user subjected to the policy check.
- The case where the authority specified in step S132 is "general user", and the user authenticated in step S130 belongs to the group subjected to a policy check.

When the user authenticated in step S130 is a user subjected to the policy check, the controller 100 (authentication information determiner 110) executes the processing of step S134 (step S202; Yes→step S134). On the other hand, when the user authenticated in step S130 is not a user subjected to the policy check, the controller 100 (authentication information determiner 110) omits the policy check and allows login (step S202; No→Step s142).

When the controller 100 (authentication information determiner 110) determines not to perform the policy check for each user or each group in step S200, the controller 100 (authentication information determiner 110) omits the processing of step S202 and executes the processing of step S134 (step S200; No→step S134).

2.2.2 Password Change Processing

Figure 14:
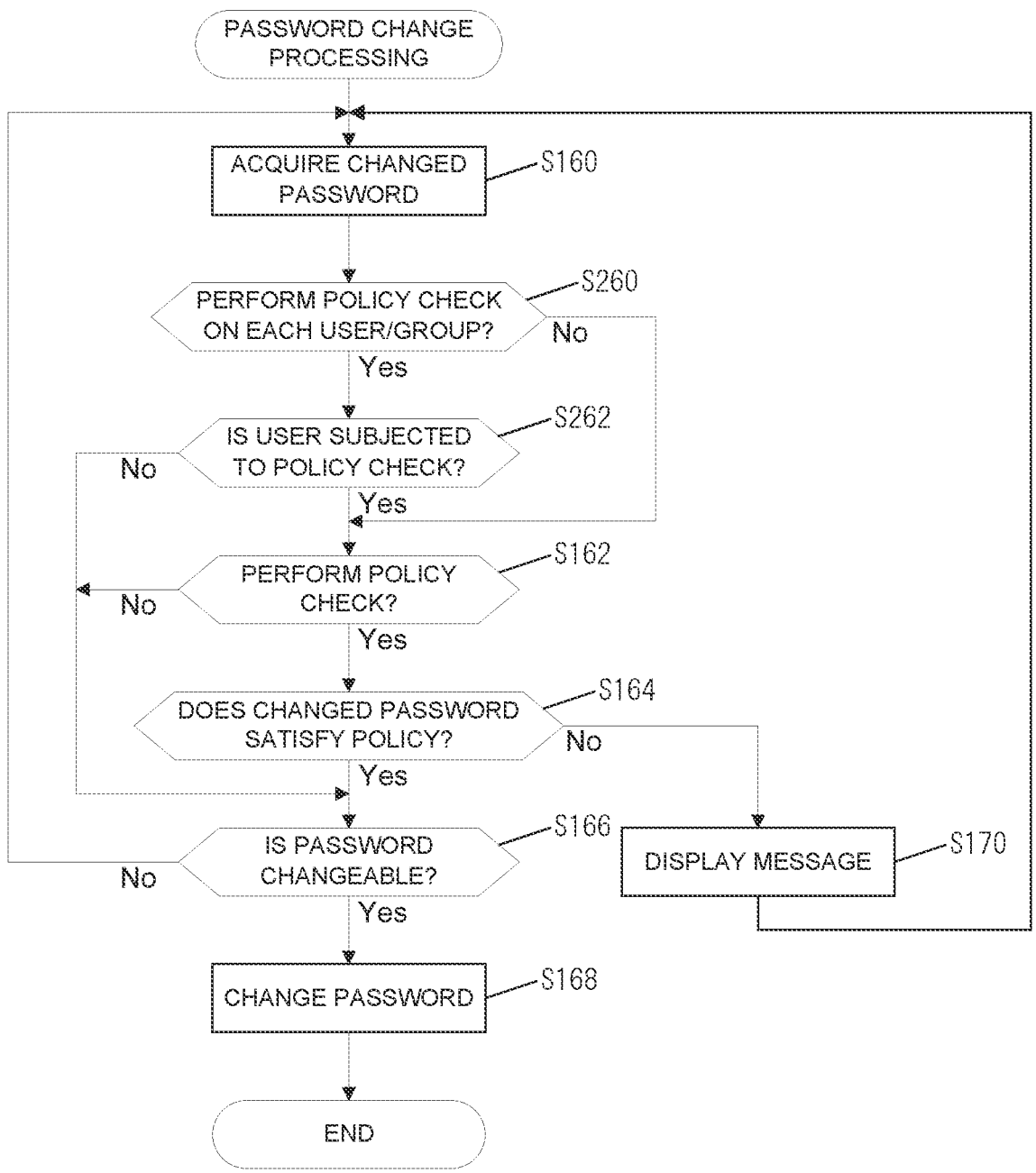
FIG. 14 is a flowchart of password change processing in the second embodiment.

Password change processing in the second embodiment will be described with reference to FIG. 14. In the second embodiment, after the processing of step S160, the controller 100 (authentication information determiner 110) determines whether to perform the policy check for each user or each group (step S260).

When the policy check is performed on each user or each group, the controller 100 (authentication information determiner 110) determines whether the logged-in use is a user subjected to the policy check (step S260; Yes→step S262). Note that the processing of step S260 and the processing of step S262 are identical to the processing of step S200 and the processing of step S202 in FIG. 13, respectively.

When the user logging in to the multifunction machine 10 is a user subjected to the policy check, the controller 100 (authentication information determiner 110) determines whether the setting to perform the policy check at the time of next password registration/change after changing the password policy setting is enabled (step S262; Yes→step S162). In this case, when said setting is enabled, the controller 100 (authentication information determiner 110) performs the policy check (step S262; Yes→Step S164), and when said setting is disabled, the controller 100 (authentication information determiner 110) omits the policy check (step S162; No→step S166). On the other hand, when it is determined that that the user logging in the multifunction machine 10 is not a user subjected to the policy check in step S262, the controller 100 (user manager 104) determines whether passwords are changeable (step S262; No→step S166). In this case, the policy check is omitted.

When the controller 100 (authentication information determiner 110) determines not to performed the policy check for each user or each group in step S260, the controller 100 (authentication information determiner 110) omits the processing of step S262 and executes the processing of step S162 (step S260; No→step S162).

In the above description, whether to perform the policy check at the time of password registration/change is determined when the logged-in user is a user subjected to the policy check; however, the determination may be omitted, and the policy check may be unconditionally performed on logged-in users. For example, in the case where the policy check is performed on each user/group, the controller 100 omits execution of the processing of step S162 shown in FIG. 14 when the logged-in user is a user subjected to the policy check. As a result, when the controller 100 (authentication information determiner 110) determines that the user logging in to the multifunction machine 10 is a user subjected to the policy check in step S262, the controller 100 (authentication information determiner 110) performs the policy check (step S262; Yes→step S164). When the controller 100 (authentication information determiner 110) determines not to perform the policy check for each user/group in step S260, the controller 100 (authentication information determiner 110) may execute the processing of step S162 as illustrated in FIG. 14 (step S260; No→step S162).

2.3 Operation Example

Figure 15:
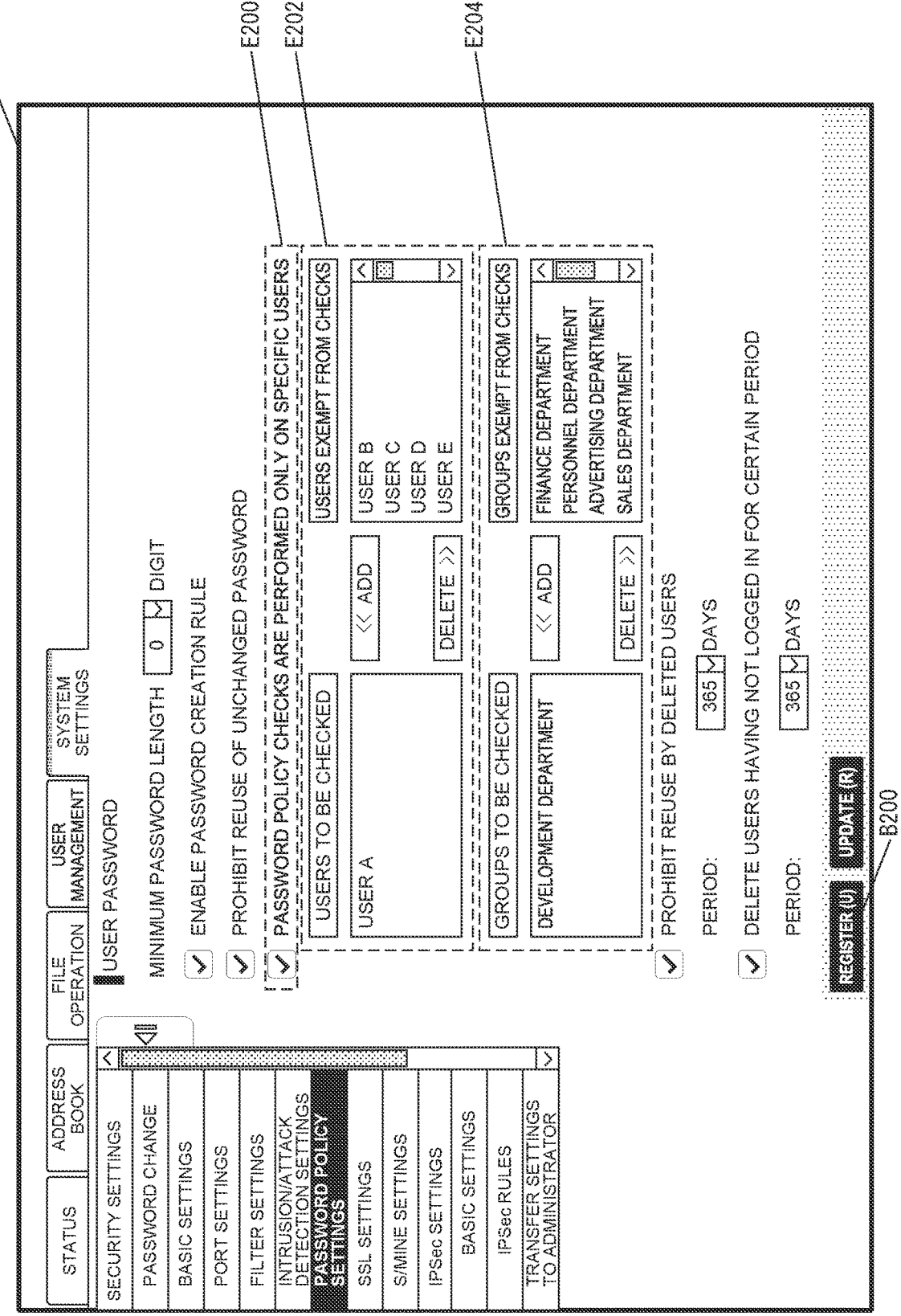
FIG. 15 is a diagram illustrating a screen example of a setting screen in the second embodiment.

An operation example of the second embodiment will be described with reference to FIG. 15. FIG. 15 is a diagram illustrating a screen example of a setting screen W200. The setting screen W200 of the second embodiment includes a region E200 in which whether to perform the policy check for each user or each group is set. A user can enable the function to perform the policy check for each user or each group by checking the box of "password policy checks are performed only on specific users".

The setting screen W200 of the second embodiment includes a region E202 in which a user subjected to the policy check is selected and a region E204 in which a group subjected to the policy check is selected. List of users registered on the multifunction machine 10 is displayed in the region E202, and a user subjected to the policy check is selected therefrom. A list of groups of the multifunction machine 10 is displayed in the region E204, and a group subjected to the policy check is selected therefrom. Multiple users or multiple groups may be selected as the user or the group subjected to the policy check.

A user selects whether to perform the policy check for each user or each group and selects a user and a group subjected to the policy check from the region E200, the region E202, and the region E204, and reflects the settings in the multifunction machine 10 by pressing a registration button B200. In this way, the user can set whether to perform the policy check for each user (each group) and select a user (group) subjected to the policy check. As a result, as illustrated in FIG. 15, the policy check is enabled for user A, and the policy check is not performed on user B (without checking).

Next, usage situations and setting examples of the multifunction machine 10 of the second embodiment will be described. In the second embodiment, whether to perform the policy check for each user or each group is set by setting 4 and setting 5 below, in addition to the setting contents from setting 1 to setting 3 described in the first embodiment.

Setting 4: The policy check is performed on a designated user

Setting 5: The policy check is performed on a designated group

Example 2 of the first embodiment has a disadvantage that the security level of the multifunction machine 10 is decreased to some extent. In order to ameliorate the disadvantage, the setting to perform the policy check on a specific user (an employee from a subcontracting company or a dispatched employee) or a specific group is configured. That is, by enabling setting 4/setting 5 above (designating a user/group on which the policy check is performed), a certain level of security can be maintained, and convenience in operation can be kept even in a shared office situation and the like.

The above description indicates that the timing to perform the policy check can be set for each user and each group; however, the content of the policy check may be settable for each user and each group. In this case, the multifunction machine 10 associates, in advance, the content of the policy check with a user or a group. The controller 100 may perform the policy check on the user authenticated in step S130 of FIG. 13 on the basis of the content of the policy check corresponding to the user or a group to which the user belongs.

For example, the content of the policy check is strictly set (for example, the minimum password length is set to eight characters) for a user for which strong security is required such as a user belonging to a personal department or a finance department or an employee from a subcontracting company. On the other hand, the content of the policy check is leniently set (for example, the minimum password length is set to five characters) for a user belonging to a department other than personal departments or finance departments and a user other than employees from a subcontracting company. Through these settings, the multifunction machine 10 can switch the content of the policy check for each user and each group to which a user belongs.

The content of the policy check may be settable through authentication means. In this case, for example, in a case where a user is authenticated using an IC card and a login name and a password, the content of the policy check is strictly set, and in a case where a user is authenticated using an IC card, a login name and a password, and an e-mail address, the content of the policy check can be leniently set.

As such, the multifunction machine of the second embodiment can adjust the extent to which the password policy is to be checked in detail for each user using the multifunction machine and can set the security level for each user or each group. As a result, the multifunction machine of the second embodiment can ensure convenience for users while ensuring a certain level of security in a more flexible manner, and can provide highly convenient service to users.

3. Third Embodiment

Next, a third embodiment will be described. In the third embodiment, the password policy is checked for each user, similar to the second embodiment. In particular, the third embodiment differs from the second embodiment in that the password policy check is performed according to a function used by a user. The difference between the third embodiment and the second embodiment is mainly described. In the third embodiment, FIG. 3 for the first embodiment is replaced with FIG. 16, FIG. 5 for the first embodiment is replaced with FIG. 17, FIG. 7 for the first embodiment is replaced with FIG. 18, and FIG. 8 for the first embodiment is replaced with FIG. 19.

3.1 Functional Configuration

FIG. 16 is a diagram illustrating an example of user information in the third embodiment. The user information in the third embodiment differs from the user information in the first embodiment in that the user information in the third embodiment includes information indicating a function used by a user in addition to the user information in the first embodiment shown in FIG. 3. In the example of FIG. 16, a copying function and an optical character recognition (OCR) function can be used with the multifunction machine 10. In addition, information on each user indicating whether the user uses only the copying function or uses the copying function and the OCR function is stored. In the example of FIG. 16, user A uses the copying function and the OCR function, and user B uses only the copying function.

FIG. 17 is a diagram illustrating an example of a setting table 166 in the third embodiment. The setting table 166 of the third embodiment differs from the setting table 166 of the first embodiment illustrated in FIG. 5 in that the timing for the policy check can be set according to the authority of a user and a function used by the user.

For example, the setting table 166 includes a setting for a user whose authority is classified as "administrator" (D300 in FIG. 17) and a setting for a user whose authority is classified as "general user", and a different setting can be configured for a user whose authority is classified as "general user" according to the function used. In the example of FIG. 17, among users whose authority is classified as "general user", a setting for a user using only the copying function (D310 in FIG. 17) and a setting for a user using the copying function and the OCR function (D320 in FIG. 17) are included.

The setting table 166 also includes a setting concerning whether to perform the policy check at the time of login (D302, D312, D322 in FIG. 17), and a setting concerning whether to perform the policy check at the time of password registration/change after changing the password policy (D304, D314, D324 in FIG. 17), for every combination of authority and a function used.

3.2 Processing Flow

3.2.1 Login Propriety Determination Processing

The login propriety determination processing in the third embodiment will be described with reference to FIG. 18. In the third embodiment, after performing the processing of step S132, the controller 100 (authentication information determiner 110) specifies a function used by the user authenticated in step S130 (step S300). For example, the controller 100 reads information on a function used included in the user information on the user authenticated in step S130 and thereby specifies the function used by the user.

Next, the controller 100 (authentication information determiner 110) determines whether to perform the policy check, at the time of login, on the user authenticated in step S130 on the basis of the authority specified in step S132 and the function used specified in step S300 (step S302).

For example, the authentication information determiner 110 reads out, from the setting table 166, a setting corresponding to the combination of the authority specified in step S132 and the function used specified in step S300. Specifically, in the case where the setting table 166 stores the pieces of information shown in FIG. 17, the authentication information determiner 110 reads out the setting (D302 in FIG. 17) concerning whether to perform the policy check at the time of login for a user whose authority is classified as "administrator", when the authority specified in step S132 is "administrator". Similarly, the authentication information determiner 110 reads out D312 in FIG. 17, when the authority specified in step S132 is "general user" and the function used by the user specified in step S300 is only the copying function. The authentication information determiner 110 reads out D322 in FIG. 17, when the authority specified in step S132 is "general user" and the function used by the user specified in step S300 is the copying function and the OCR function. When the setting to perform the policy check at the time of login is "enabled" among settings read out, the authentication information determiner 110 determines to perform the policy check at the time of login, and when said setting is "disabled", the authentication information determiner 110 determines not to perform the policy check at the time of login.

Figure 18:
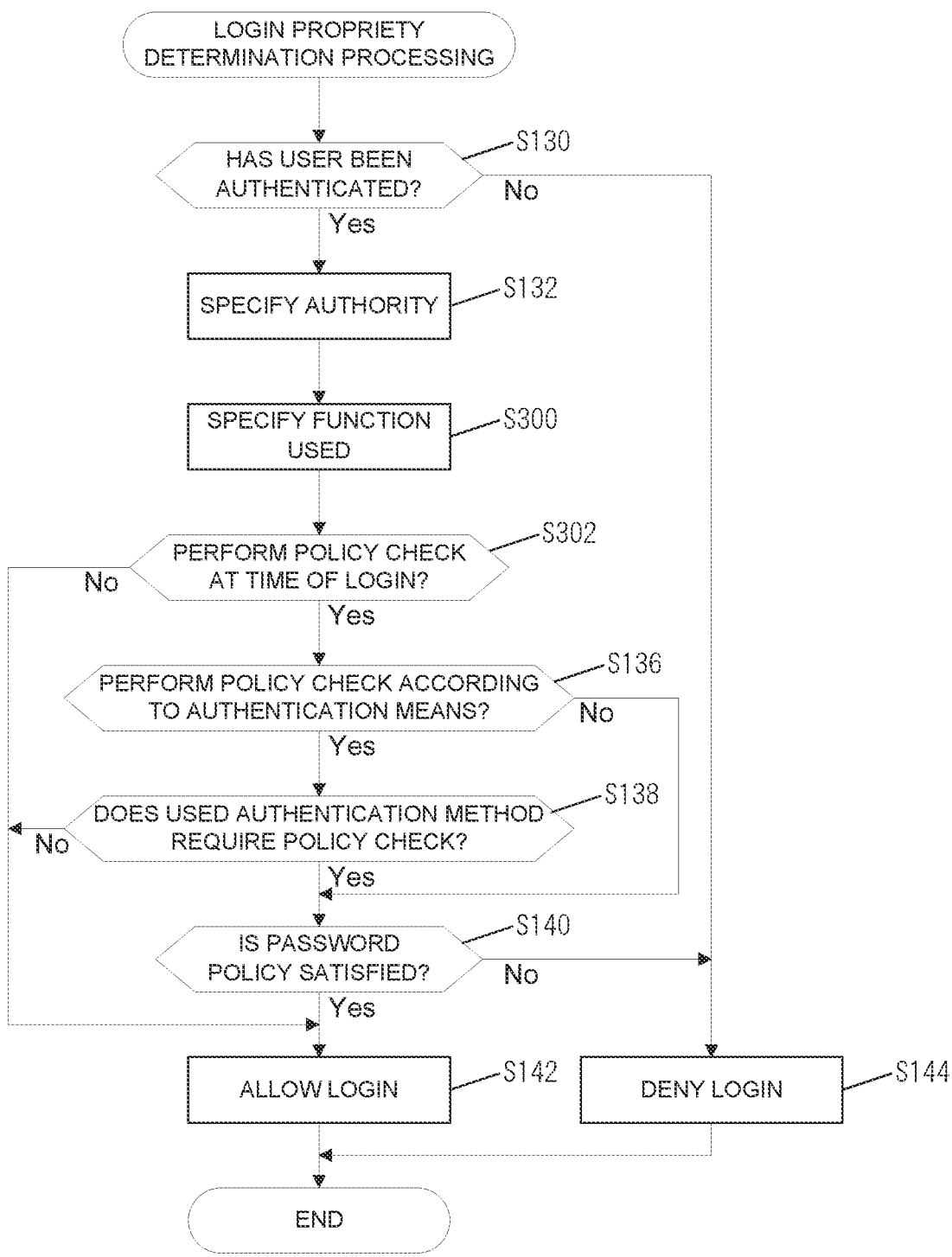
FIG. 18 is a flowchart of login propriety determination processing in the third embodiment.

When the policy check is performed at the time of login, the controller 100 (authentication information determiner 110) performs the policy check by executing the processing from step S136 to step S144 in FIG. 18 on the basis of the setting read out in step S302 (step S302; Yes). On the other hand, when the policy check is not performed at the time of login, the controller 100 (authentication information determiner 110) omits the policy check and allows login (step S302; No→step S142). In this way, the authentication information determiner 110 can omits the policy check when the user authenticated in step S130 does not use a function subjected to the policy check.

3.2.2 Password Change Processing

Password change processing of the third embodiment will be described with reference to FIG. 19. In the third embodiment, after the processing of step S160, the controller 100 (authentication information determiner 110) specifies the authority of a logged-in user and a function used by the user (step S360). The processing of step S360 is identical to the processing of step S132 and step S300 in FIG. 18.

The controller 100 (authentication information determiner 110) reads out a corresponding setting from the setting table 166 on the basis of the authority and the function used specified in step S360, and determines whether to perform the policy check (step S362). The processing of step S362 is identical to the processing in FIG. 18 except that the setting for the time of password registration/change after changing the setting is read out.

When the policy check is performed, the controller 100 (authentication information determiner 110) performs the policy check on the basis of the setting read out in step S362 (step S362; Yes→step S164). On the other hand, when the controller 100 (user manager 104) determines not to perform the policy check, the controller 100 (user manager 104) determines whether the password is changeable (step S362; No→step S166). In this case, the policy check is omitted.

Figure 19:
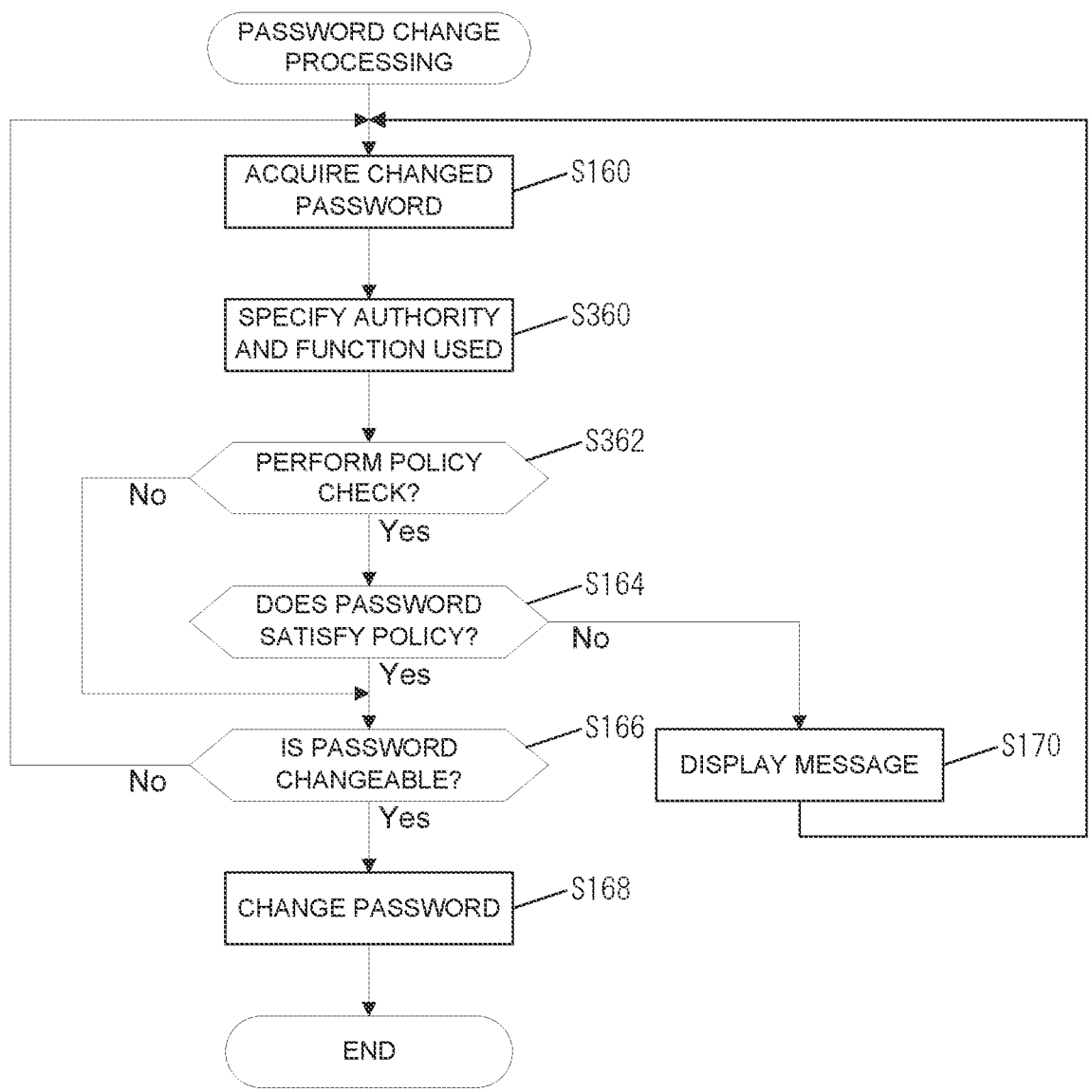
FIG. 19 is a flowchart of password change processing in the third embodiment.

In this way, the controller 100 can perform the policy check for each user according to the function used by the user using the multifunction machine 10 by executing the processing of FIG. 18 and FIG. 19.

3.3 Operation Example

An operation example of the third embodiment will be described with reference to FIG. 20. FIG. 20 is a diagram illustrating a screen example of a setting screen W300. The setting screen W300 of the third embodiment includes a region E300 in which the timing to perform the policy check is set according to a function used by a user.

The region E300 includes a tub-type user interface (UI). A label of each tab indicates the type of a function used by a user, and the timing for the policy check can be set for a user using the function indicated by the label of the tab by switching the tabs. A user can set the timing for the policy check for each type of the function used by a user by switching the tabs.

In the above description, the timing to perform the policy check can be set according to a function used by a user, the content of the policy check may be settable according to a function used by a user. For example, the content of the policy check on a user using many functions (for example, a user using the copying function and the OCR function) may be tightened, and the content of the policy check on a user using a few functions (for example, a user using only the copying function) may be loosened. The multifunction machine 10 may suggest, to a user (for example, an administrator of the multifunction machine 10), a content of the policy check according to the type and the number of functions used.

As such, according to the multifunction machine of the third embodiment, the timing to perform the policy check can be set according to a function used. As a result, the multifunction machine of the third embodiment can be operated such that the policy check on a user using a few functions is loosened, and the policy check on a user using more functions is tightened. As a result, both convenience of the multifunction machine and a minimum level of security performance can be maintained in a more flexible manner.

4. Modifications

The present disclosure is not limited to the embodiments described above, and various modifications may be made. That is, the technical scope of the present disclosure also includes embodiments obtained by combining technical measures that are modified as appropriate without departing from the spirit of the present disclosure.

Although the above-described embodiments are described separately for convenience of explanation, it is needless to say that such embodiments may be combine and carried out within a technically allowable range. For example, the second embodiment and the third embodiment may be combined. In this case, a multifunction machine in which a user or a group subjected to the policy check can be selected, and the timing for the policy check can be changed according to a function used by a user subjected to the policy check can be provided.

In the above-described embodiments, the policy check is performed according to the settings for each user in a multifunction machines, which is an image forming apparatus; however, the policy check may be performed according to settings for each user in an information processing apparatus used by multiple users, such as an image reading apparatus including a scanner, and a server device. The policy check may be performed according to settings for each user in service used by multiple users. In this way, the policy check is performed according to settings corresponding to the authority or group of a user for each user in an information processing apparatus or service.

The programs operating on respective devices in the embodiments are programs for controlling a CPU or the like (programs that cause a computer to function) so as to implement the functions of the above-described embodiments. Information handled by these devices is temporary accumulated in a temporary storage device (for example, a RAM) during processing, is then stored in various storage devices such as a read only memory (ROM) and an HDD, and is read out, corrected, and written by the CPU as needed.

Here, a recording medium that stores the programs may be any of a semiconductor medium (for example, a ROM or a non-volatile memory card), an optical recording medium/ magneto-optical recording medium (for example, a digital versatile disc (DVD), a magneto optical disc (MO), a Mini Disc (MD), a compact disc (CD), or a Blu-ray (registered trademark) disc (BD)), and a magnetic recording medium (for example, magnetic tape or a flexible disk). Execution of a loaded program not only implements the functions of the above-described embodiments but also implements, in some cases, the functions of the present disclosure through processing in cooperation with an operating system or another application program or the like on the basis of an instruction from the program.

For market distribution, the program may be stored in a portable recording medium for distribution or transferred to a server computer connected via a network such as the Internet. In this case, a storage device of the server computer is also included in the present disclosure as a matter of course.

The present application claims priority from Japanese Application JP 2022-088680, the content of which is hereby incorporated by reference into this application.

What is claimed is:
1. An image forming apparatus, comprising:
one or more controllers; and
a memory storing one or more computer-readable instructions and authentication information of a plurality of users, wherein
the one or more controllers are configured to execute the one or more computer-readable instructions stored in the memory to:

set, for each user of the plurality of users, an authentication requirement for the authentication information of the user;
authenticate the user based on the authentication information of the user; and
perform a determination as to whether the authentication information of the user being authenticated satisfies the authentication requirement corresponding to the user,
set a time for the determination,
perform the determination at a time set as the time for the determination,
determine whether to perform the determination at a time of login,
disallow, in a case that the determination is performed at the time of login, the user to log in when the authentication information of the user being authenticated does not satisfy the authentication requirement corresponding to the user at the time of login,
determine whether to perform the determination according to an authentication method, and
omit performing, in a case that the determination is performed at the time of login, the determination for the user when a user being authenticated uses the authentication method without the determination.

2. The image forming apparatus according to claim 1, wherein
the one or more controllers are further configured to configure a setting according to an authority.

3. The image forming apparatus according to claim 2, wherein
the authority is an administrator or a general user, and
the one or more controllers are further configured to:
set a user or a group of the plurality of users, whose authority is set to the general user, subject to performing the determination, and
omit performing the determination when a user being authenticated is a user other than the user subjected to performing the determination or is a user not belonging to the group subjected to the determination.

4. The image forming apparatus according to claim 1, wherein
the one or more controllers are further configured to:
determine whether to perform the determination according to a function, and
omit performing the determination when a user being authenticated does not use the function subjected to performing the determination.

5. An image forming apparatus, comprising:
one or more controllers; and
a memory stores one or more computer-readable instructions and authentication information of a plurality of users, wherein
the one or more controllers are configured to execute the one or more computer-readable instructions stored in the memory to:
set, for each user of the plurality of users, an authentication requirement for the authentication information of the user,
authenticate the user based on the authentication information of the user,
perform determination as to whether the authentication information of the user being authenticated satisfies the authentication requirement corresponding to the user,
set a time for the determination,
perform the determination at a time set as the time for the determination,
determine whether to perform the determination at a time of changing the authentication information after changing the authentication requirement, and
display, in a case that the determination is performed at the time of changing the authentication information, a message urging input of the changed authentication information again when changed authentication information of the user for which the authentication information is changed does not satisfy the authentication requirement corresponding to the user.

6. A determination method in a processing apparatus, comprising:
storing authentication information of a plurality of users;
setting, for each user of the plurality of users, an authentication requirement for the authentication information of the user;
authenticating the user based on the authentication information of the user;
performing determination as to whether the authentication information of the user being authenticated satisfies the authentication requirement corresponding to the user;
setting a time for the determination;
performing the determination at a time set as the time for the determination;
determining whether to perform the determination at a time of login;
disallowing, in a case that the determination is performed at the time of login, the user to log in when the authentication information of the user being authenticated does not satisfy the authentication requirement corresponding to the user at the time of login;
determining whether to perform the determination according to an authentication method; and
omitting performing, in a case that the determination is performed at the time of login, the determination for the user when a user being authenticated uses the authentication method without the determination.

\* \* \* \* \*